(12) United States Patent
Kim et al.

(10) Patent No.: US 7,746,900 B2
(45) Date of Patent: Jun. 29, 2010

(54) LOW-LEVEL COMMUNICATION LAYERS AND DEVICE EMPLOYING SAME

(75) Inventors: Han-gyoo Kim, Irvine, CA (US); Kyung Tae Kim, Irvine, CA (US); Il-gu Hong, Irvine, CA (US); Jung Kyun Ahn, Kyunggi Do (KR); Jun Mo Park, Seoul (KR); Han Kyu Lim, Seoul (KR)

(73) Assignee: Zhe Khi Pak, Moscow (RU)

( * ) Notice: Subject to any disclaimer, the term of this patent is extended or adjusted under 35 U.S.C. 154(b) by 1159 days.

(21) Appl. No.: 11/187,762

(22) Filed: Jul. 22, 2005

(65) Prior Publication Data

US 2006/0045130 A1 Mar. 2, 2006

Related U.S. Application Data

(60) Provisional application No. 60/590,722, filed on Jul. 22, 2004.

(51) Int. Cl.
*H04J 3/16* (2006.01)

(52) U.S. Cl. .................................................. 370/469

(58) Field of Classification Search ............... 370/469, 370/389, 328, 352, 353, 401, 349, 466, 467, 370/419, 465, 310, 471; 709/220, 218, 219; 713/200–201; 710/22
See application file for complete search history.

(56) References Cited

U.S. PATENT DOCUMENTS

| | | | |
|---|---|---|---|
| 5,329,619 | A | 7/1994 | Page et al. |
| 5,426,427 | A | 6/1995 | Chinnock et al. |
| 5,463,772 | A | 10/1995 | Thompson et al. |
| 5,513,314 | A | 4/1996 | Kandasamy et al. |
| 5,524,247 | A | 6/1996 | Mizuno |
| 5,566,331 | A | 10/1996 | Irwin et al. |
| 5,721,818 | A * | 2/1998 | Hanif et al. ............. 709/228 |
| 5,774,660 | A | 6/1998 | Brendel et al. |
| 5,781,550 | A | 7/1998 | Templin et al. |
| 5,812,930 | A | 9/1998 | Zavrel |

(Continued)

FOREIGN PATENT DOCUMENTS

DE 19610840 9/1997

(Continued)

OTHER PUBLICATIONS

Japanese Office Action, App. No. 555298/2002, Jan. 9, 2007.

(Continued)

*Primary Examiner*—Chi H Pham
*Assistant Examiner*—Alexander Boakye
(74) *Attorney, Agent, or Firm*—Rothwell, Figg, Ernst & Manbeck, PC

(57) ABSTRACT

An electronic device employing an efficient network protocol stack. The protocol stack comprises a network-level protocol layer configured to provide a transmission service for transferring data to and from a computer network, and a device-level protocol layer configured to send and receive information specific to an interface of the electronic device over the network via the transmission service of the network-level protocol layer. Alternately, each of the network-level protocol layer and the device-level protocol layer may be employed individually with other network protocol layers to construct a functioning network protocol stack.

19 Claims, 34 Drawing Sheets

U.S. PATENT DOCUMENTS

| | | | |
|---|---|---|---|
| 5,838,916 | A | 11/1998 | Domenikos et al. |
| 5,889,942 | A | 3/1999 | Orenshteyn |
| 5,987,523 | A | 11/1999 | Hind et al. |
| 5,987,627 | A | 11/1999 | Rawlings, III |
| 5,999,808 | A | 12/1999 | LaDue |
| 6,047,307 | A | 4/2000 | Radko |
| 6,085,234 | A | 7/2000 | Pitts et al. |
| 6,128,644 | A | 10/2000 | Nozaki |
| 6,128,690 | A | 10/2000 | Purcell et al. |
| 6,167,490 | A | 12/2000 | Levy et al. |
| 6,175,869 | B1 | 1/2001 | Ahuja et al. |
| 6,216,202 | B1 | 4/2001 | D'Errico |
| 6,314,465 | B1 | 11/2001 | Paul et al. |
| 6,317,775 | B1 | 11/2001 | Coile et al. |
| 6,327,594 | B1 | 12/2001 | Van Huben et al. |
| 6,345,300 | B1 | 2/2002 | Bakshi et al. |
| 6,347,095 | B1 * | 2/2002 | Tang et al. ............... 370/469 |
| 6,356,915 | B1 | 3/2002 | Chtchetkine et al. |
| 6,360,265 | B1 | 3/2002 | Falck et al. |
| 6,366,988 | B1 | 4/2002 | Skiba et al. |
| 6,389,432 | B1 | 5/2002 | Pothapragada et al. |
| 6,393,569 | B1 | 5/2002 | Orenshteyn |
| 6,404,766 | B1 | 6/2002 | Kitai et al. |
| 6,421,753 | B1 | 7/2002 | Hoese et al. |
| 6,449,647 | B1 | 9/2002 | Colby et al. |
| 6,470,389 | B1 | 10/2002 | Chung et al. |
| 6,510,164 | B1 | 1/2003 | Ramaswamy et al. |
| 6,518,965 | B2 | 2/2003 | Dye et al. |
| 6,523,066 | B1 | 2/2003 | Montroy et al. |
| 6,529,996 | B1 | 3/2003 | Nguyen et al. |
| 6,539,446 | B1 | 3/2003 | Chan |
| 6,578,111 | B1 | 6/2003 | Damron et al. |
| 6,594,677 | B2 | 7/2003 | Davis et al. |
| 6,598,068 | B1 | 7/2003 | Clark |
| 6,609,167 | B1 * | 8/2003 | Bastiani et al. ............. 710/104 |
| 6,647,016 | B1 * | 11/2003 | Isoda et al. ................. 370/412 |
| 6,732,104 | B1 | 5/2004 | Weber |
| 6,760,783 | B1 | 7/2004 | Berry |
| 6,807,581 | B1 | 10/2004 | Starr et al. |
| 6,823,458 | B1 | 11/2004 | Lee et al. |
| 6,834,326 | B1 | 12/2004 | Wang et al. |
| 6,894,981 | B1 | 5/2005 | Coile et al. |
| 6,941,576 | B2 | 9/2005 | Amit |
| 7,010,303 | B2 | 3/2006 | Lewis et al. |
| 7,069,312 | B2 * | 6/2006 | Kostic et al. ................ 709/220 |
| 7,069,350 | B2 * | 6/2006 | Fujita et al. ................. 710/22 |
| 7,076,690 | B1 | 7/2006 | Todd et al. |
| 7,124,128 | B2 | 10/2006 | Springer et al. |
| 7,251,704 | B2 | 7/2007 | Solomon et al. |
| 7,254,578 | B2 | 8/2007 | Devarakonda et al. |
| 7,277,955 | B2 | 10/2007 | Elliott |
| 7,376,133 | B2 * | 5/2008 | Gettala et al. ............... 370/389 |
| 7,383,229 | B2 | 6/2008 | Jacoby |
| 2002/0069245 | A1 | 6/2002 | Kim |
| 2003/0014569 | A1 | 1/2003 | Kim |
| 2003/0018403 | A1 | 1/2003 | Braun et al. |
| 2003/0028614 | A1 | 2/2003 | Jeon |
| 2003/0172149 | A1 | 9/2003 | Edsall et al. |
| 2003/0225834 | A1 | 12/2003 | Lee et al. |
| 2004/0068563 | A1 | 4/2004 | Ahuja et al. |
| 2004/0117813 | A1 | 6/2004 | Karaoguz et al. |
| 2004/0220933 | A1 | 11/2004 | Walker |
| 2005/0042591 | A1 | 2/2005 | Bloom et al. |
| 2005/0110768 | A1 | 5/2005 | Marriott et al. |
| 2005/0149682 | A1 | 7/2005 | Kim |
| 2005/0193017 | A1 | 9/2005 | Kim |
| 2005/0193189 | A1 | 9/2005 | Kim |
| 2006/0004935 | A1 | 1/2006 | Seto et al. |
| 2006/0010287 | A1 | 1/2006 | Kim |
| 2006/0067356 | A1 | 3/2006 | Kim |
| 2006/0069884 | A1 | 3/2006 | Kim |
| 2006/0155805 | A1 | 7/2006 | Kim |
| 2007/0008988 | A1 | 1/2007 | Kim |

FOREIGN PATENT DOCUMENTS

| | | |
|---|---|---|
| DE | 10038142 | 2/2001 |
| JP | 10113469 | 5/1998 |
| JP | 10271562 | 10/1998 |
| JP | 11007404 | 1/1999 |
| JP | 11114224 | 4/1999 |
| KR | 2000072493 | 12/2000 |
| KR | 2001088528 | 9/2001 |
| WO | WO99/03297 | 7/1999 |
| WO | WO00/29529 | 5/2000 |

OTHER PUBLICATIONS

Japanese Office Action, App. No. 513300/2003, Feb. 6, 2007.
Blunden et al., "Storage Network Virtualization: What's it all about?", ibm.com/redbooks, XP-002286341, pp. 1-110, Dec. 2000.
Klein, Yaron, "Storage Virtualization with iSCSI Protocol", Internet Draft, XP-015030964, pp. 1-15, Nov. 2, 2000.
Schulz, Greg, "SAN and NAS; Complementary Technologies", http://www.mti.com/white_papers/WP20002.pdf, XP-002201566, pp. 1-7, May 1, 2000.
Supplementary European Search Report, Application No. 01272932.3, 4 pages, Nov. 5, 2007.

* cited by examiner

110'

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|

| | 160' | 180' |
|---|---|---|
| 0 | 2    PACKET SIZE | DESTINATION PORT |
| 4 | SOURCE PORT   190' | MESSAGE ID   460 |
| 8 | MESSAGE LEN   170 | FRAGMENT ID   480 |
| 12 | FRAGMENT LEN   490 | RESERVED |

FIG. 15

Packet Format of Device-Level Protocol 650

General Request Format 710

| byte | 0-7 | 8-15 | 16-31 |
|---|---|---|---|
| 0 | Operation code 730 | Flags | |
| 4 | Host Session Identifier (HSID) 740 | | |
| 8 | Remote Session Identifier (RSID) 750 | | Sub-Session Number 760 |
| 12 | Data Segment Length 770 | | |
| 16 | Total AHS Length 780 | | Command Sub-Packet Sequence Number 800 |
| 20 | Path Command Tag 790 | | |
| 24 | Initiator Task Tag 810 | | |
| 28 | Data Transfer Length 820 | | |
| 32 | Target ID 830 | | |
| 36 | LUN 840 | | |
| 40 | | | |
| 44 | | | |
| 48 | | | |
| 52 | | | |
| 56 | | | |

FIG. 22

General Response Format 720

| | 0-7 | 8-15 | 16-23 | 24-31 |
|---|---|---|---|---|
| 0 | Operation code 730 | Flags | Response 850 | Status 860 |
| 4 | Host Session Identifier (HSID) 740 | | | |
| 8 | Remote Session Identifier (RSID) 750 | | Sub-Session Number 760 | |
| 12 | Data Segment Length 770 | | | |
| 16 | Total AHS Length 780 | | Command Sub-Packet Sequence Number 800 | |
| 20 | Path Command Tag 790 | | | |
| 24 | Initiator Task Tag 810 | | | |
| 28 | Data Transfer Length 820 | | | |
| 32 | Target ID 830 | | | |
| 36 | LUN 840 | | | |
| 40 | | | | |
| 44 | | | | |
| 48 | | | | |
| 52 | | | | |
| 56 | | | | |

FIG. 23

LOW-LEVEL COMMUNICATION LAYERS AND DEVICE EMPLOYING SAME

This application claims the benefit of U.S. Provisional Application Ser. No. 60/590,722, entitled "Low-Level Communication Layers and Device Employing Same," filed on Jul. 22, 2004, hereby incorporated herein in its entirety.

BACKGROUND ART

1. Field of the Invention

The present invention relates generally to the field of network-connected electronic devices, and more specifically to network-connected electronic devices employing low-level communication protocols.

2. Background of the Invention

The use of networks, including local area networks (LANs), wide area networks (WAN), the Internet, intranets, and myriad other interconnection configurations for electronic devices, has increased greatly over the last several years, due at least in part to the new uses for which such networks may be employed.

For example, a recent innovation involving the use of a network is the ability to connect remote devices, such as computer peripheral devices, to a host computer via a network in a manner transparent to the user. Such a configuration is described in detail in U.S. patent application Ser. No. 09/974,082 to Han-Gyoo Kim, entitled "Disk System Adapted to Be Directly Attached to Network," which published as Patent Application Publication No. 2002/0069245 and which is hereby incorporated by reference in its entirety. Host computers may encompass a wide range of devices, including general purpose computers, personal audio/video players, personal digital assistants (PDAs), and many more. The peripheral devices, such as hard disk drives, compact disc (CD) drives, digital video (or versatile) disc (DVD) drives, and similar devices, are commonly located within the same physical enclosure as the associated host computer. However, by instead using a network to connect the peripheral devices with the computer, several advantages are realized. For example, the host computer system can be physically smaller and lighter, as the attached computer peripherals are no longer located within the computer enclosure. Also, power requirements of the peripherals do not need to be satisfied by the power supply of the host computer system. Further, any heat or noise generated by the peripheral device is remote from the location of the user, making for a more enjoyable user experience. Also, multiple computers may access the same network peripheral device without any computer required to act as a host or server. Additionally, access to greatly increased peripheral device capacity, such as data storage, is possible via network connection than with peripheral devices directly attached to a computer system, especially when a portable host system is involved. These and many other potential advantages from connecting remote computer peripherals to host systems through a network have been identified.

Several ways of connecting remote peripheral devices to host computer systems via a network have been devised, such as server/client architectures and Storage Area Networks (SANs). However, many of these connection schemes require significant processing overhead in terms of additional hardware and multiple network-based communication protocols in order to utilize the network. This often results in extended latency and/or decreased throughput of data transfer between the host system and the remote device. Additionally, in the case of SANs, a separate file server in addition to the remote storage device is required, typically increasing the cost of the configuration.

Accordingly, a need exists in the art for an improved communications protocol allowing efficient attachment of a remote device to a computer system by a network.

SUMMARY OF THE INVENTION

Generally, one embodiment of the present invention encompasses an electronic device, such as a host computer or a computer peripheral device, that may include two separate network protocol layers utilized in tandem as a protocol stack to communicate with another electronic device over a computer network, such as Ethernet LAN. Alternate embodiments of the invention may include only one of these protocol layers. A first protocol layer is a network-level protocol layer configured to transmit connection and service data across the computer network, for example to provide and acknowledge a network connection. The second layer is a device-level protocol layer configured to send and receive information specific to an interface of the electronic device over the network via the transmission service of the network-level protocol layer. Alternately, each of the protocol layers may instead be combined with other network protocols to form the protocol stack for the electronic device.

Another embodiment of the present invention takes the form of a protocol facilitating communication between at least a first device and a second device, comprising a network protocol later operative to transmit a network-level command between at least the first and the second device, and a device protocol layer operative to transmit a device command relating to a device associated with at least one of the first and second devices.

In various embodiments of the invention, the low-level network protocol layer provides general network communications management and a non-device-specific mechanism to facilitate data transfer, thus allowing generalized communication over the network between two electronic devices. The device-level protocol layer allows communications (typically in the form of device interface commands and/or device status) to be transferred between the host and remote device attached to a network. The device-level protocol is generally carried via (or within) the network-level protocol layer transmission service. Each of the protocol layers presents an efficient, low-overhead communication mechanism to facilitate high-bandwidth, low-latency data transfers between electronic devices coupled by way of a network.

Additional embodiments and advantages of the present invention will become apparent to those skilled in the art upon reading the following detailed description of the invention.

BRIEF DESCRIPTION OF THE FIGURES

FIG. 15 depicts the header format of the datagram service of the network-level protocol of FIG. 1A.

FIG. 22 depicts the format of the request packet of the device-level protocol of FIG. 1A.

FIG. 23 depicts the format of the response packet of the device-level protocol of FIG. 1A.

DETAILED DESCRIPTION OF THE INVENTION

1. Dual-Layer Protocol Stack

Figure 1A:
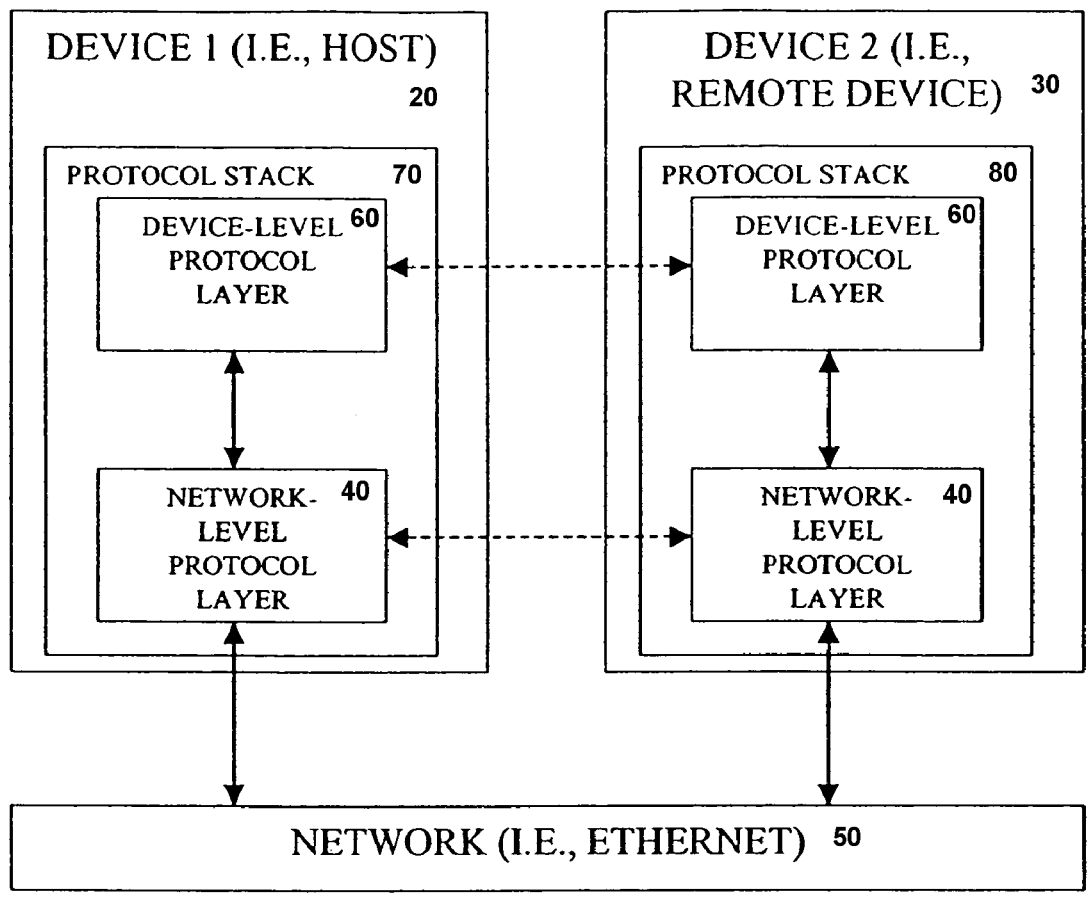
FIG. 1A is a block diagram of a host and a remote device employing a two-layer network communication protocol according to an embodiment of the present invention.

One embodiment 10 of the present invention, as shown in FIG. 1A, generally takes the form of a dual-layer low-level communication protocol stack for communication between two electronic devices such as a host computer 20 and a remote device 30 (for example, a remote data storage device), communicating by a network. A network-level protocol layer 40 resides at the lowest layer of the stack. In the particular embodiment disclosed herein, the network-level protocol layer 40 is implemented on a local- or wide-area network employing an Ethernet-based, datagram, or other similar communication service.

Logically speaking, the network-level protocol layer 40 supports an interface between the lower network and upper transport layers of the seven-layer International Standards Organization Open System Interconnection (ISO OSI) network protocol model. More specifically, the network-level protocol layer facilitates minimal overhead while handling transmission errors, providing flow control, and facilitating data retransmission.

The network-level protocol layer 40 supports two basic types of packet transmission services: stream and datagram. The stream service provides flow control, packet sequencing, and a retransmission mechanism for missing or faulty packets. Also, connection status checking and abnormal disconnection detection are implemented. The datagram service provides an alternative involving less overhead, whereby no data reliability service is provided. Additionally, the network-level protocol layer 40 may be extended to provide additional services, such as support for various Quality of Service (QoS) levels, which may require the remote device 30 to guarantee some minimum level of service to the host 20. Ethernet is one example of a network 50 employing stream routing.

Referring again to FIG. 1A, atop the network-level protocol layer 40 is a device-level protocol layer 60, which provides a framework for command-and-response communication that the devices 20,30 attached to a network 50 can directly understand. The device-level protocol layer 60 supports the establishment and release of secure sessions between two separate network-attached devices, as well as providing a vehicle for the passing of commands, status and data formatted for a device-level interface employed by the devices.

Actual information flow in the embodiment of FIG. 1A follows the path of the solid arrows shown: down a protocol stack 70 of Device 1 20, across the network 50, and up the protocol stack 80 of Device 2 30, and vice-versa. However, due to the separation of duties between the two layers of the protocol stack 70, each layer implemented within a device 20, effectively operates as if it is communicating directly with the corresponding layer of the remote device 30 accessed across the network 50, as shown by the dotted arrows of FIG. 1A. This architecture conceptually simplifies communications-related software, and possibly hardware, in each device that implements each protocol layer 40, 60.

The combined use of the network-level protocol layer 40 and the device-level protocol 60 layer provides an efficient and robust means for two electronic devices 20, 30 to communicate over a LAN or other network 50. Details of each of the protocol layers 40, 60 are presented below.

Reference is often made herein to a "device" 20, 30, particularly when describing operation of either protocol. It should be understand that this term may refer not only to a read-write or other remote device, but also to a computing system.

Figure 1B:
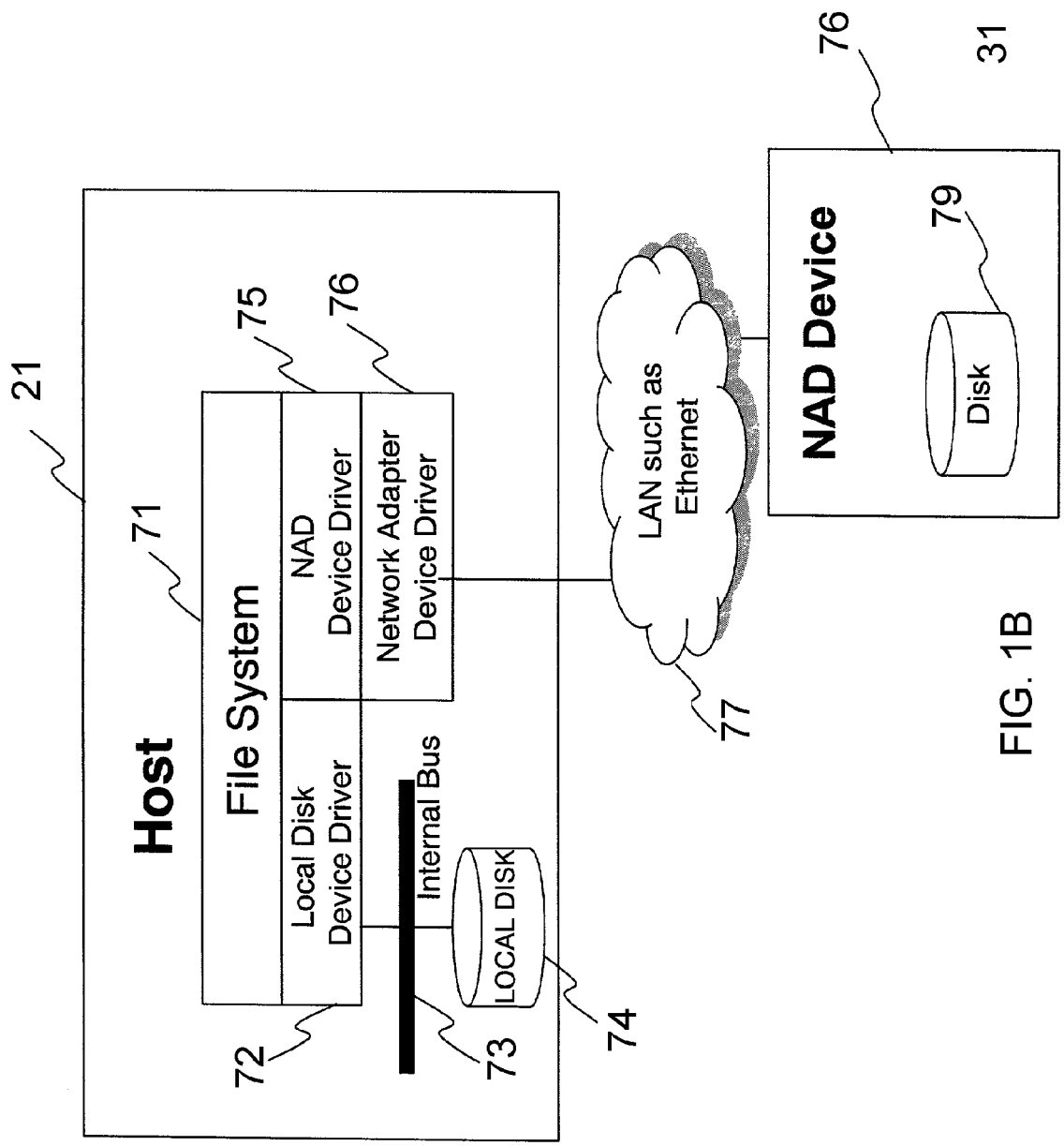
FIG. 1B illustrates a host computing system connected to a remote device.

FIG. 1B illustrates a host computing system 21 connected to a remote device 31. A host 21 has a file system 71, which may contain a local disk device driver 72 that controls a local disk 74 connected to an internal system bus 73. A local device is defined as a device inside a standard-alone system as opposed to a network device connected to a network. Local devices are directly connected to a system bus often through an adapter called a host bus adapter allowing the host to communicate with the devices without going through any network, whereas network devices are not directly connected to a system bus, rather connected through an interface called a network interface card (NIC) installed on system bus. The local disk 74 may be a conventional IDE (Integrated Drive Electronics) disk or SCSI (Small Computer System Interface) disk.

The file system 71 also contains a network-attached disk (NAD) device driver 75 that controls a NAD device 78 connected through a network adapter device driver 76 and a network 77 such as Ethernet. The NAD device 78 contains one or more disks 79. The network 77 is an existing general-purpose network for carrying storage traffic as well as other application traffic. This so called "front-end" network for carrying general-purpose network traffic is distinguished from a "back-end" network dedicated to storage such as that used in the conventional Storage Area Network (SAN) scheme.

Figure 1C:
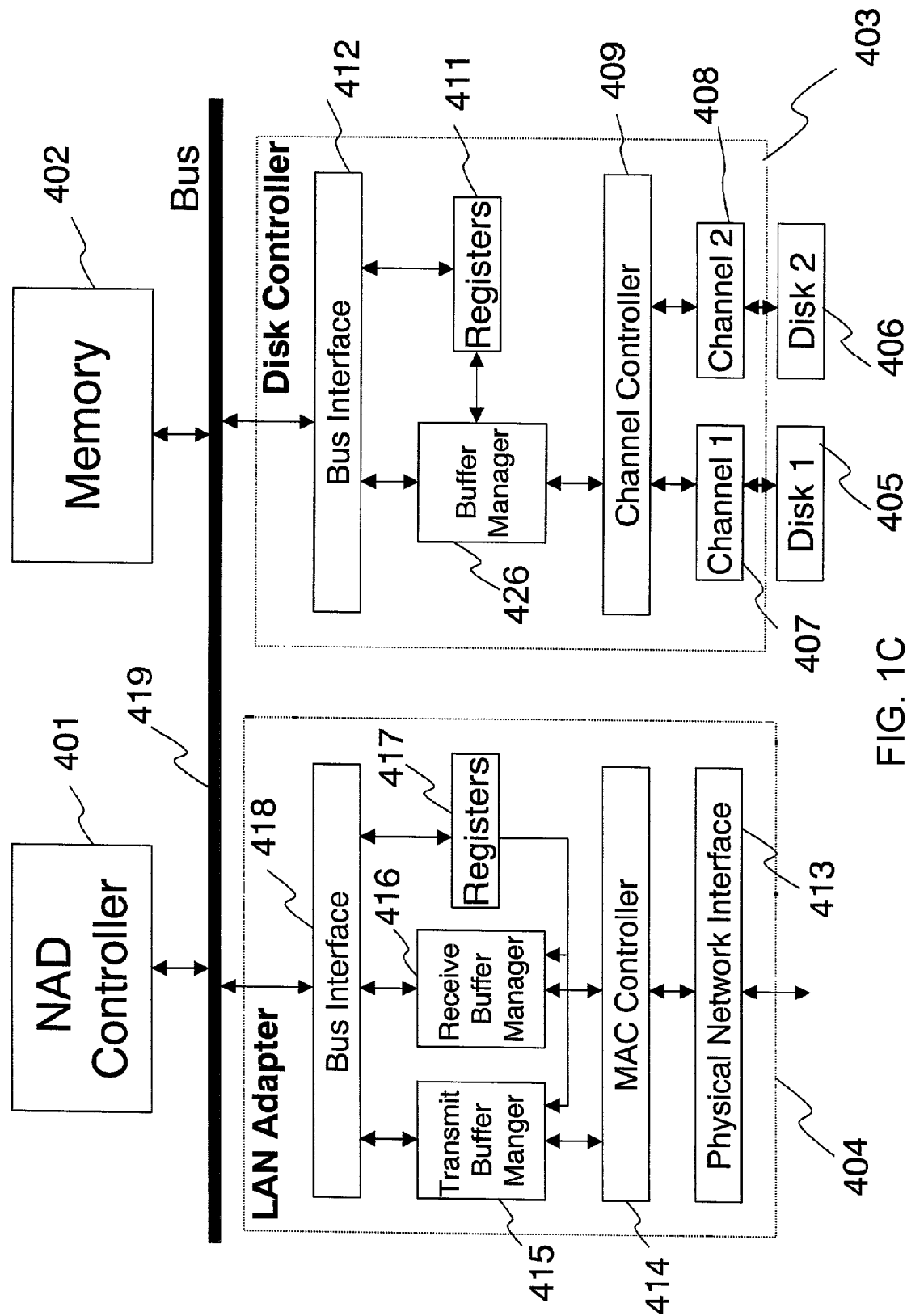
FIGS. 1C and 1D illustrate a remote device and a controller for a remote device, respectively.

FIG. 1C shows a functional block diagram of a NAD device 31. A NAD device 31 is comprised of an NAD controller 401 for controlling the whole NAD device 31, memory 402, a disk controller 403 for executing a disk access command, one or more disks 405, 406, and a LAN adapter 403 for receiving a disk access command from a host through a network. The NAD controller 401, the memory 402, the disk controller 403, and the LAN adapter 404 are all connected to a bus 419 internal to the NAD device 31.

The disk controller 403 is a module that performs disk I/O operations by controlling the disks 405 and 406 over internal disk channels. The disk controller 403 is further comprised of one or more disk channels 407 and 408 controlled by a channel controller 409, a buffer manager 426, some registers 411, and a bus interface 412. The buffer manager 426 consults the registers 411 to obtain a disk sector number and a channel to execute a disk access command. The buffer manager 426 also commands the channel controller 409 to transfer data from the memory to disk channel 407 or 408 or vice versa as a result of executing a disk access command. The channel controller 409 actually accesses the disk over the disk channel 407, 408 to transfer data from the disk to the memory or vice versa.

The LAN adapter 404 is a module that receives disk I/O command packets from the host and transmits replay packets over the network. The LAN adapter 404 is further comprised of a physical network interface 413 for interfacing with the network, a MAC (media access control) controller 414, transmit buffer 415 for storing transmit data, a receive buffer 416 for storing receiving data 416, registers 417, and a bus interface 418.

The bus interface 418 transfers data from the bus to the transmit buffer 415, the receive buffer 416, and the registers 417, or vice versa. The MAC controller 414 transfers data to the physical network interface 413 so that the physical network interface can transmit the data to the host computer. When the physical network interface 413 receives a disk I/O request packet from the host computer, it transfers the packet to the MAC controller 414 so that the MAC controller can extract necessary data from the packet and transfer the data to the receive buffer 416.

Figure 1D:
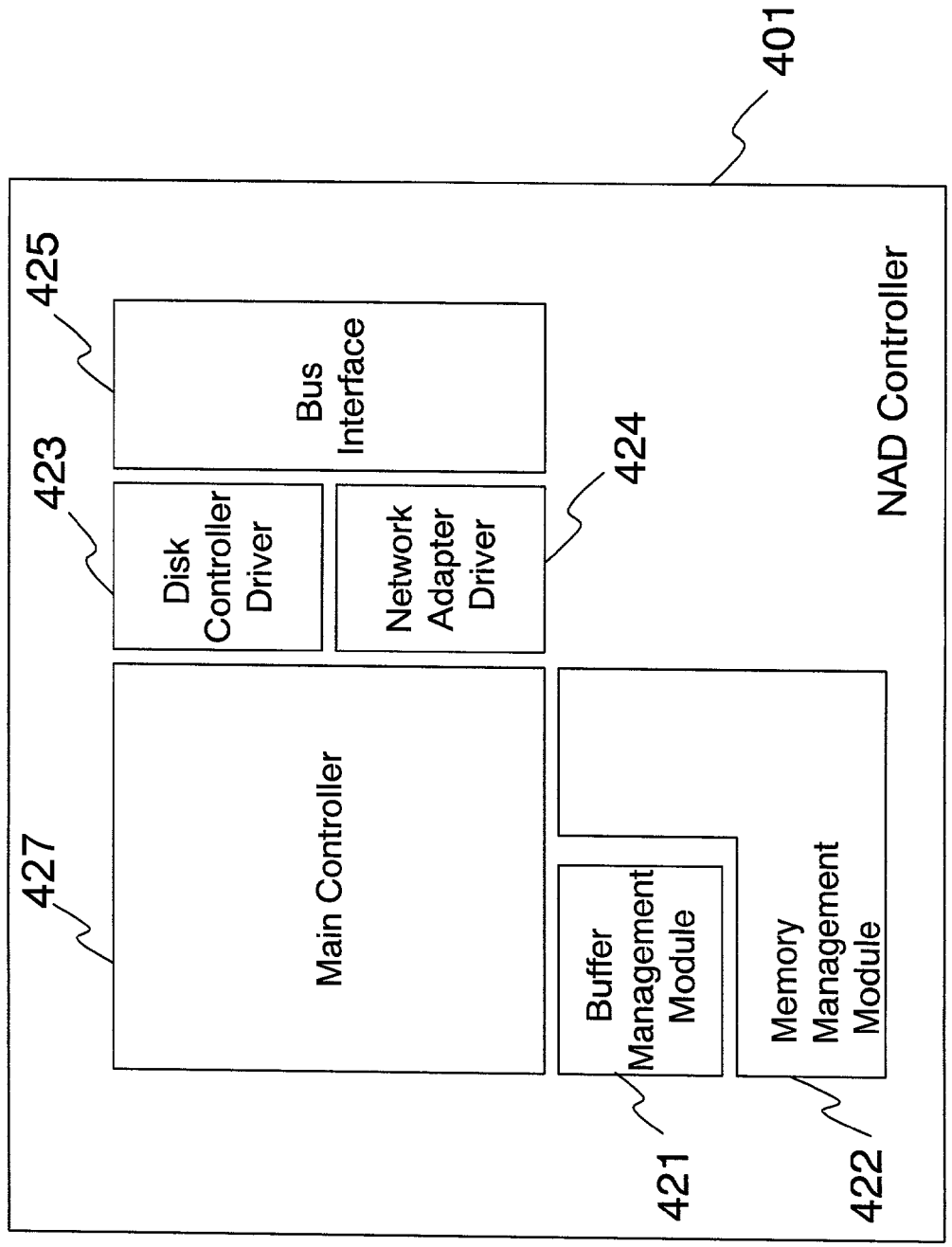

FIG. 1D shows that the NAD controller 401 may be comprised of a main control 427 for controlling the NAD 31, a buffer management module for caching data in the disk 421, a memory management module for managing assignment of memory space 422, a disk controller driver 423 for interfacing with the disk controller, a network adapter driver 424 for interfacing with the network adapter, and a bus interface 425 for interfacing with the bus inside the NAD. The NAD controller 401 mainly executes I/O commands from the host's NAD device driver, but it can perform other additional functions.

2. The Network-Level Protocol Layer

Figure 2:
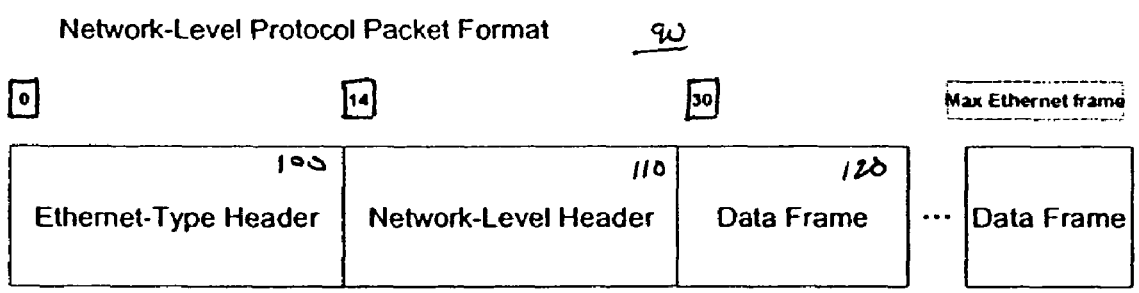
FIG. 2 depicts the general format of a packet of a network-level protocol according to an embodiment of the invention.

Data being transferred between devices 20, 30 at the network-level protocol layer 40 are formatted in packets of up to 16384 bytes (i.e., 16 kilobytes (KB)) in length. FIG. 2 depicts the general format of a network-level packet 90 having a 14-byte Ethernet-type header 100, a 16-byte network-level header 110, and a data frame 120 with a variable length of up to 4066 bytes.

Figure 3:
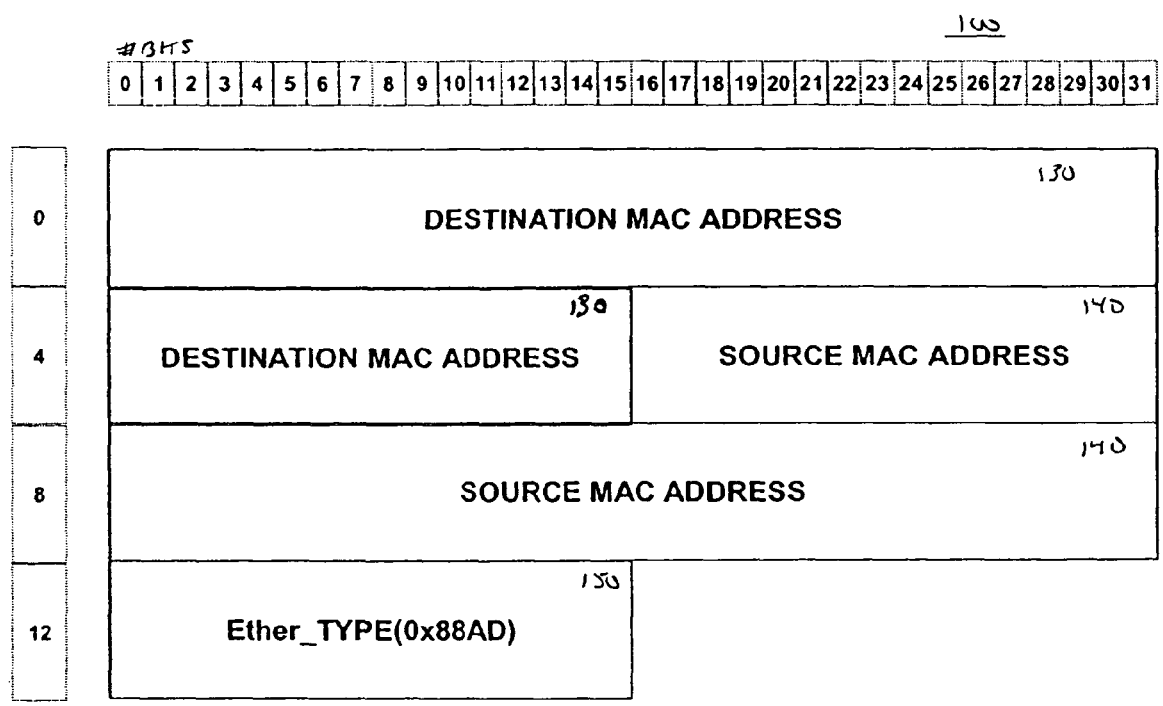
FIG. 3 depicts the format of an Ethernet-type header of the network-level protocol packet of FIG. 2.

The Ethernet-type header 100, similar in definition to that found in most Ethernet frames employed in various Ethernet-based networks 50, is displayed in FIG. 3. Contained within the Ethernet-type header 100 are six bytes of destination MAC (Media Access Control) address 130, six bytes of source MAC address, and two bytes specifying an Ethernet-type code 150.

The source MAC address 130 specifies the particular device 20, 30 placing the network-level packet 90 onto the network 50. Similarly, the destination MAC address identifies the intended recipient of the packet 90. Typically, the first three bytes of both the source and destination MAC addresses 130, 140 incorporate a vendor number indicating the manufacturer of the network communication hardware used to attach to the network 50. Further, the last three bytes of these addresses normally incorporate a serial number for that hardware assigned by the vendor.

The type code 150 of the Ethernet-type header 100 identifies the type of communication represented in the next level of the protocol stack 70, 80. In other words, the type code determines how the next "layer" of information in the packet is to be interpreted. In this one particular case, the type code is, in hexadecimal format, 0x88AD, which refers specifically to the network-level protocol layer 40 of this embodiment 10 of the present invention.

Figure 4:
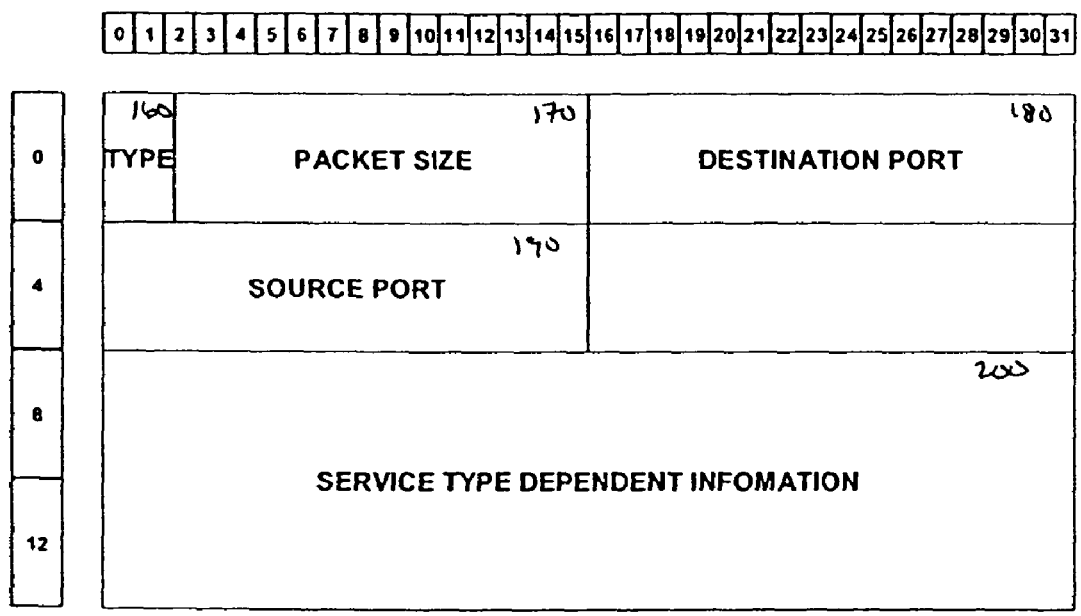
FIG. 4 depicts the network-level header of the network-level protocol packet of FIG. 2 when an Ethernet service is employed.

Given that the type code 100 indicates the network-level protocol layer 40 as described herein, the next 16 bytes of the network-level packet format 100 form the network-level header 110, as shown in FIG. 4. This header consists of a 2-bit service type field 160, a 14-bit packet size 170, a two-byte destination port 10, a two-byte source port 190, and ten bytes of service-dependent information 200.

The 2-bit service type field 160 specifies the type of transmission service provided by the packet 90. A value of 0x0 indicates a "raw" service, in which the data within the data frame of the packet is considered raw, or unformatted, data; such a service is of limited value in the disclosed embodiments of the present invention, and is not discussed in detail herein. A service type field of 0x1 indicates a so-called "next generation" service, which typically incorporates some enhancements to the two remaining stream and datagram services. A value of 0x02 signifies a datagram transmission service, while 0x03 denotes a stream transmission service. Each of these last three services is described in greater detail below.

The 14-bit packet size 170 indicates the total number of bytes included within the entire packet 90, thus allowing a maximum of $2^{14}$, or 16384, or 16K, bytes in may embodiments of the present invention.

The destination and source ports signify particular source and, destination "processes" identified with the packet 90 within the host 20 and the remote device 30. More particularly, each port or process identifies a particular application or protocol, such as HyperText Transfer Protocol (HTTP) or File Transfer Protocol (FTP), to be associated with the packet. Some port numbers may be associated with permanent applications/protocols, while others may be more ephemeral in nature, and thus existing only during a particular established connection between the source and destination processes within the host and the remote device.

The service-dependent information 200 in the network-level protocol header 110 depends upon the particular service indicated in the 2-bit service type code 160. For example, the bit and byte definitions for the information provided in those bytes during datagram service are different from those provided during streaming service. The service-dependent information 200 for each of these services is described in greater detail below.

Streaming Service

Figure 5:
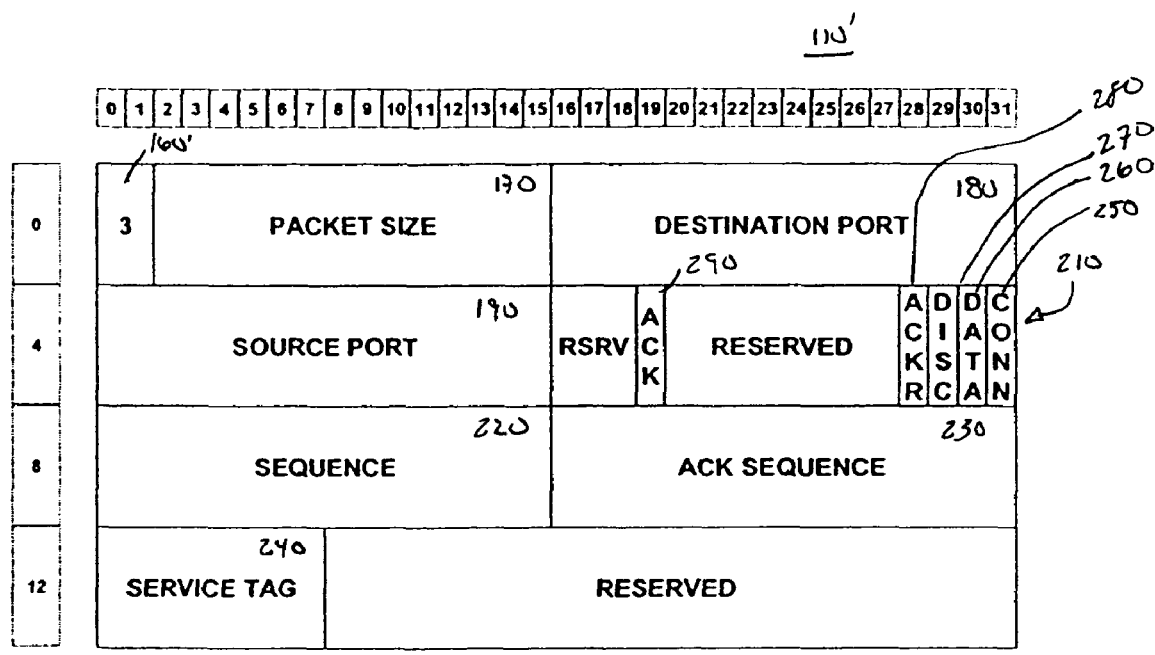
FIG. 5 depicts the format of the network-level header of FIG. 4 when a streaming service is employed.

FIG. 5 details the format of the network-level header 110 when streaming service is employed. The 2-bit service type field 160 is 0x03, indicating the header is used in packets sent across a network 50 employing a streaming service. Also, the packet size 170, source port 190, and destination port fields 180 are as described above.

Specific to the stream service within the service dependent information 200 are two bytes of control flags 210, a two-byte sequence number 220, a two-byte acknowledge sequence number 230, and a one-byte service tag 240.

The two bytes of control flags 210 within the stream service header identify the specific packet type of the current packet. Specifically, a value of 0x0001 in the control flag bytes indicates a connection request (CONN) packet 250, 0x0002 identifies a data (DATA) packet 260, 0x0004 specifies a disconnection request (DISC) packet 270, 0x0008 is an acknowledgement request (ACKR) packet 280 (i.e., requesting that an acknowledgement packet be sent by another device), and 0x1000 is an acknowledgement (ACK) packet 290.

In some cases, more than one control flag 210 may be set for a particular packet 90. More specifically, each packet may have only one of the CONN 230, DISC 270, or DATA 260 control flags set, but ACK 290 can be set simultaneously with any other flag except ACKR 280. For example, as will be seen later, a packet may have both the CONN and ACK flags set simultaneously to indicate the present packet 90 included both a connection packet and an acknowledgement of a previous packet.

The sequence number 220 identifies the place the packet 90 takes in the order in which a series of packets have been sent during a particular connection. Similarly, the acknowledgement sequence number 230 is the sequence number of the packet the device 30 expects to receive from the device 20 on the other end of the connection. Packets with any of the CONN 250, DISC 270, or DATA 260 flags cause the sequence number 220 to be incremented by one. However, packets with just an ACK 290 or ACKR 280 flag active do not cause the sequence number to be incremented.

Finally, the service tag 240 is a connection ID that allows a networked device 20, 30 to distinguish between two different connections or packets 90 sent across networks 50 employing the same source 190 and destination 180 port numbers. For example, a host device 20 connected with a remote device may disconnect abnormally due to an extraordinary circumstance, such as a power failure. After resetting itself, the host device 20 may then reconnect with the remote device 30 using the previous port numbers. In that case, the remote device 20 may use the service tag 240 to discover that a new connection is involved.

Figure 6:
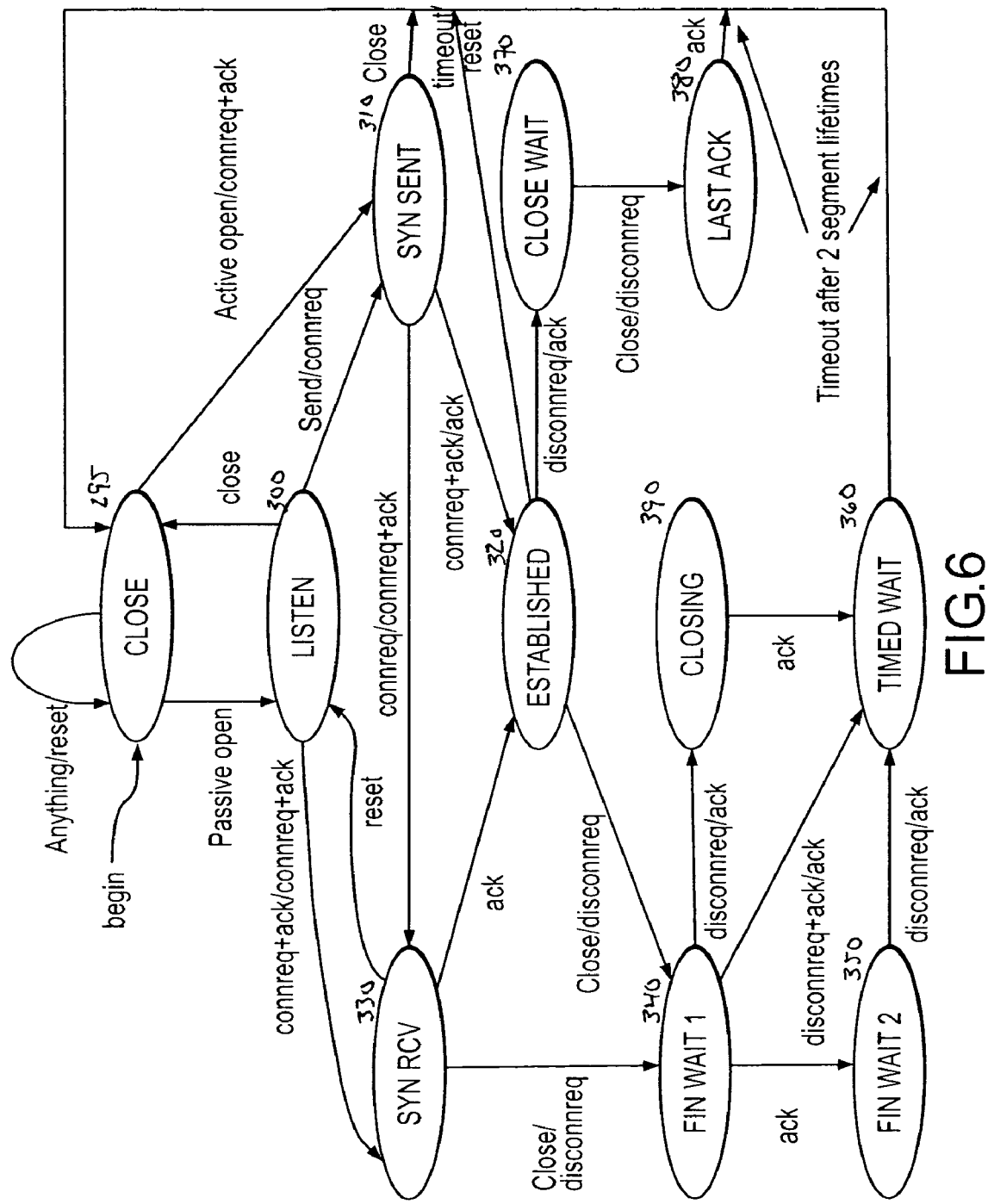
FIG. 6 is a device state transition diagram of the streaming service of the network-level protocol of FIG. 1A.

FIG. 6 is diagram showing the possible states and related transitions of a device 20, 30 during streaming service. The network protocol 40 may provide, among other options, flow control, packet sequencing, and a retransmission mechanism to impart a reliable, robust communication connection during streaming.

Initially, a device 20, 30 on the network typically exists in a CLOSE state 290, in which the device is not yet ready to begin the connection process with another device on the network. Often, this state is entered after a reset of the device, or after the normal or abnormal termination of a previous connection with another device.

Once a first device 20 is ready to engage in a connection, it normally transfers to the LISTEN state 300, wherein the first device is waiting for a connection request from a second device 30 on the network. This transition indicates that the first device is entering a "passive open" mode, whereby the first device is ready to take part in establishing a connection, but is not yet initiating a connection.

After sending a CONN packet 250 to a second device 30 to initiate a connection, the first device 20 transitions from the LISTEN state 300 to the SYN_SENT ("synchronization sent") state 310, where it waits for a CONN/ACK packet 255 from the second device. Once a CONN/ACK packet 255 has been received from the second device, the first device sends an ACK packet 290 to the second device and transitions from the SYN_SENT state 310 to the ESTABLISHED state 320. This indicates a connection has been established between the first and second devices 20 30, and transfer of data packets 90 may begin. A more detailed discussion of the ESTABLISHED state appears below.

If, instead, while in the LISTEN state 300, the first device 20 receives a CONN packet 250 from a second device 30 that desires to initiate a connection, the first device returns a CONN/ACK packet 255 to the second device and enters the SYN_RECV ("synchronization received") state 330. Once the second device 30 has returned an ACK packet 290, the first device 20 enters the ESTABLISHED state 320.

Alternately, when the first device 20 is in the CLOSE state 290, a transition directly to the SYN_SENT state 310 may be made by issuing a CONN/ACK packet 255 to a second device 30. As before, the first device would then wait for a CONN/ACK packet from the second device before sending an ACK packet 290 and transitioning to the ESTABLISHED state.

Figure 7:
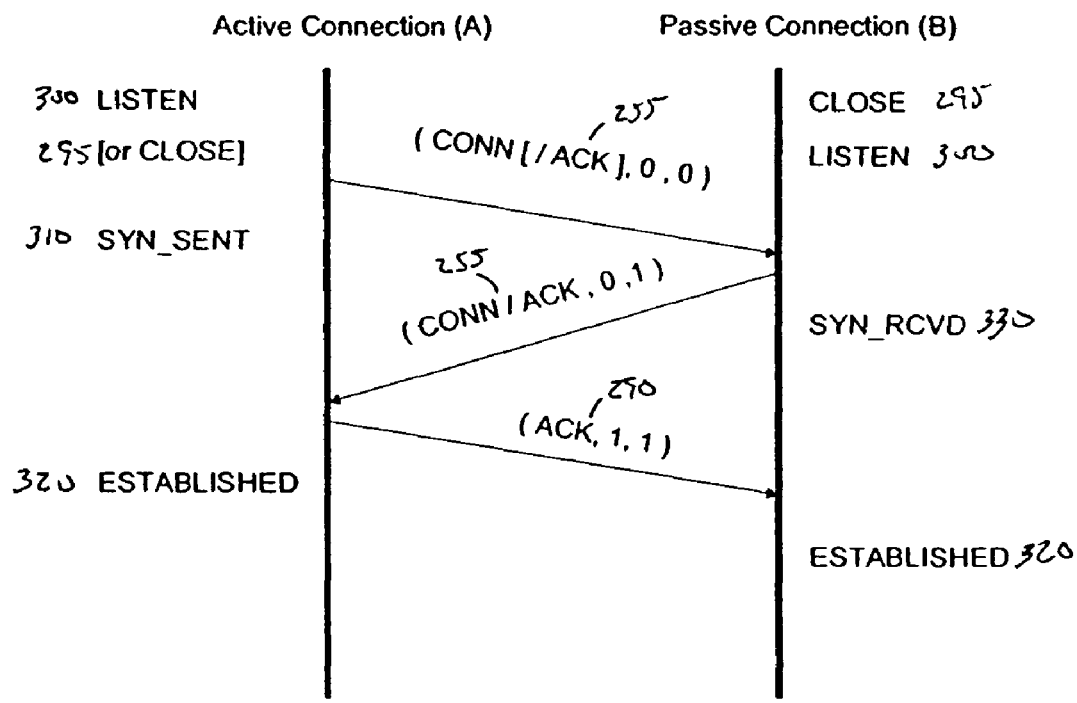
FIG. 7 depicts the establishment of a connection between devices during the streaming service of the network-level protocol of FIG. 1A.

FIG. 7 graphically shows the three-way handshake interaction between a first device 20 (Active Connection A) and a second device 30 (Passive Connection B) in the typical method of establishing a connection during stream mode. Presuming the packet type (0x03) 160, source 140 and destination 130 MAC addresses, source 190 and destination 180 ports, and the service tags 240 are set properly for the packets being transferred between the two devices, the first device 20, which is initiating the connection, sends a CONN packet 250 (if in the LISTEN state 300) or a CONN/ACK packet 255 (if in the CLOSE state 290) to the second unit, and enters the SYN_SENT state 310 to wait for a CONN/ACK packet from the second device 30. Once the second device receives the CONN or CONN/ACK packet from the first device, the second device issues a CONN/ACK packet of its own and enters the SYN_RECV state 310. Upon receipt of the CONN/ACK packet from the second device 30, the first device 20 issues an ACK packet 290 and enters the ESTABLISHED state 320. The second device, upon receiving the ACK packet from the first device, enters the ESTABLISHED state as well.

FIG. 7 also shows the changes in the sequence and acknowledgement sequence numbers during an exchange of packets 90. The first packet sent by the first device 20 indicates a sequence number 220 of zero (i.e., the first packet sent during a connection), and a sequence acknowledgement number 230 of 0 (i.e., the first device is awaiting the first packet from the second device for this connection). The second device 30 then indicates its first sequence number of zero, and specifies that it expects a sequence number of one (with a sequence acknowledgement number of one) for the next packet sent by the first device. Similarly, the second packet from the first device has a sequence number of one, as expected, and indicates that the next sequence number from the second device should also be one by transmitting a packet with a sequence acknowledgement number of one. The packets 90 issued back and forth between the two devices 20, 30 should continue in this fashion until the connection is terminated; otherwise, a problem has occurred requiring retransmission of one or more packets.

In some cases, after sending a CONN packet 250 and transitioning to the SYN_SENT state 310, the first device 20 may receive a CONN packet without the corresponding ACK control flag 290, indicating that the second device 90 did not receive the CONN packet from the first device. In that case, the first device responds with a CONN/ACK packet 255, and transitions to the SYN_RECV state 330 as if it had not sent the original CONN packet. Effectively, the first and second devices switch operating states.

During the connection process, one of the devices 20, 30 may encounter a situation requiring that the connection be canceled. For example, if a first device initiating a connection with a CONN packet 250 sent to a second device 30 determines that the connection process must be terminated while in the SYN_SENT state 310 (e.g., no ACK was received from the second device), the first device may then transfer to the CLOSE state 295.

In a similar manner, if a first device in the SYN_RECV state 330 encounters a situation in which the connection process must be ended, instead of returning an ACK packet 290 to a second device 30 that previously issued a CONN packet 250, the first device 20 may issue a DISC packet 270 to initiate a disconnection sequence, described as follows.

To actively "disconnect," or destroy, a current connection between two devices 20, 30 from the ESTABLISHED state 320, a first device 20 sends a DISC or DISC/ACK 275 packet to the second device 30 with which it is connected, and then transitions to the FIN_WAIT_1 state to await 340 a DISC/ACK packet 275 from the second device. Once the DISC/ACK packet from the second device has been received, the first device sends an ACK packet to the second device and enters the TIMED_WAIT state, in which the first device remains during a predetermined time-out period of about one second (the TIMED_WAIT TIMEOUT period), after which the first device enters the CLOSE state.

While waiting in the FIN_WAIT_1 state 310, if the first device 20 instead receives an ACK packet 290 (as opposed to a DISC/ACK packet) from the second device 30, the first device enters the FIN_WAIT_2 state 350 to await a DISC packet 270 from the second device. After the DISC packet is received from the second device, the first device then sends an ACK packet to the second device and transitions to the TIMED_WAIT state 360, where the first device stays for the time-out period TIMED_WAIT_TIMEOUT before entering the CLOSE state 295.

If the first device 20 instead receives a DISC packet 30 from a second device 30 while in the ESTABLISHED state 320, the first device enters the CLOSE_WAIT state 370, then returns a DISC/ACK packet 275 and transitions again to the LAST_ACK state 380 to await an ACK packet 290 from the second device. Once the ACK packet from the second device has been received, the first device enters the CLOSE state 295.

Figure 8:
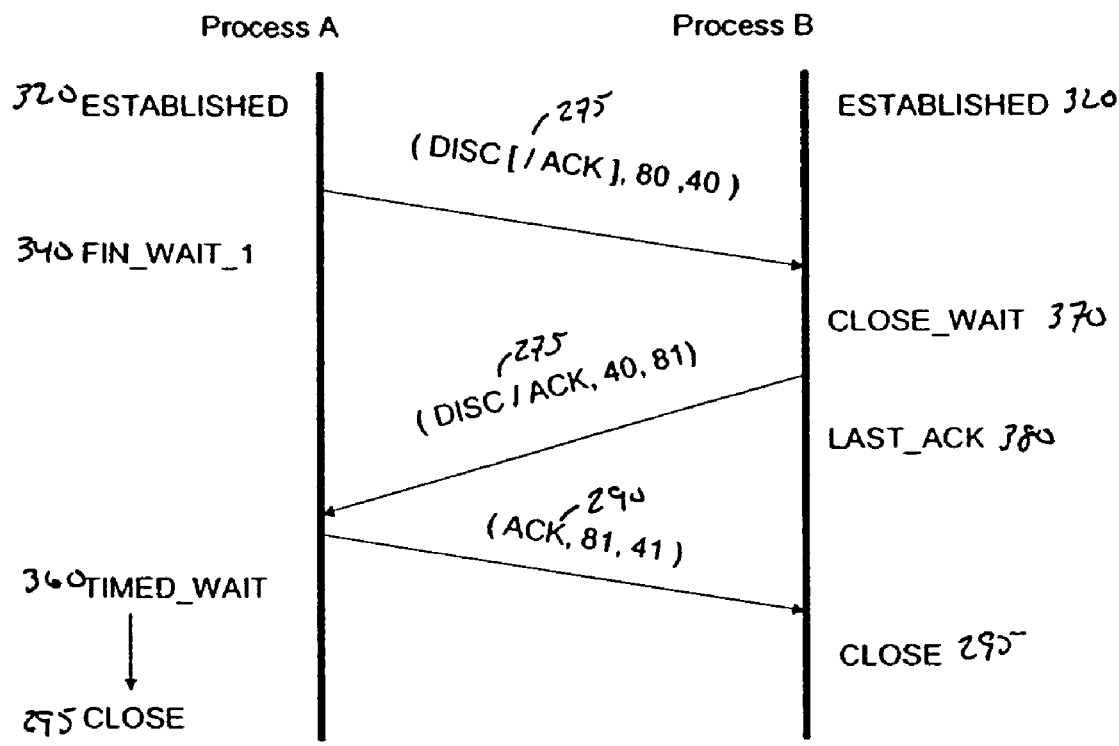
FIG. 8 depicts the termination of a connection between devices during the streaming service of the network-level protocol of FIG. 1A.

FIG. 8 depicts a normal active disconnection sequence between a first device (Process A) and a second device 30 (Process B), with the first device initiating the disconnection by way of a DISC 220 or DISC/ACK packet 275. This figure also shows the incrementing of the sequence 220 and acknowledgement sequence 230 numbers of each packet 90. Incrementing is generally handled as above. That is, in the first DISC packet, Process A signals the DISC packet is sequence number 80, and a sequence number of 40 is expected from Process B. Process B then replies in its DISC/ACK packet with a sequence number of 40, as expected, and a sequence acknowledgement number of 81. The difference in sequence and acknowledgement sequence numbers is due to the lack of sequence number incrementing with ACK-only packets from the second device during data packet transfers from the first device while in the ESTABLISHED state 320 prior to disconnection.

Figure 9:
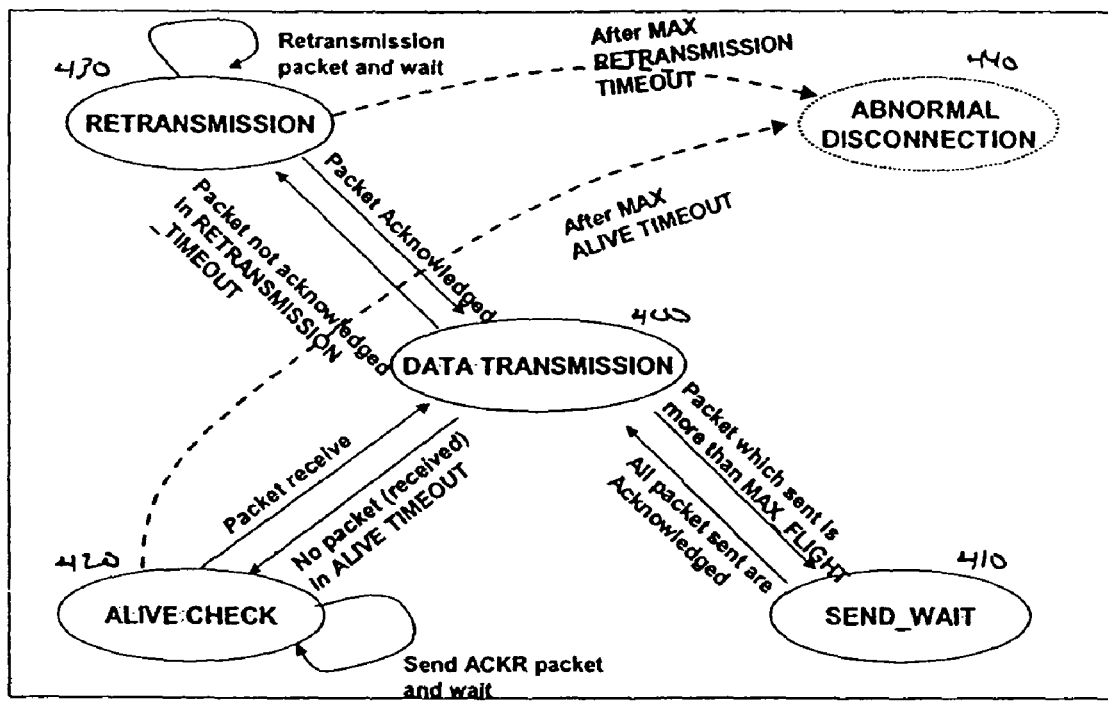
FIG. 9 depicts the device substrates and related transitions associated with the ESTABLISHED state of the network-level protocol shown in FIG. 6.

FIG. 9 displays in detail substrates and related transitions of the ESTABLISHED state 320. When a first device 20 and a second device 30 first enter the ESTABLISHED state, they reside in the DATA_TRANSMISSION substrate, which indicates that the two devices are ready for data interchange. Under normal circumstances during DATA_TRANSMISSION, the device sending data sends DATA packets to the device receiving packets. The receiving device responds with ACK packets 290, with each ACK packet corresponding to a particular DATA packet.

Figure 10:
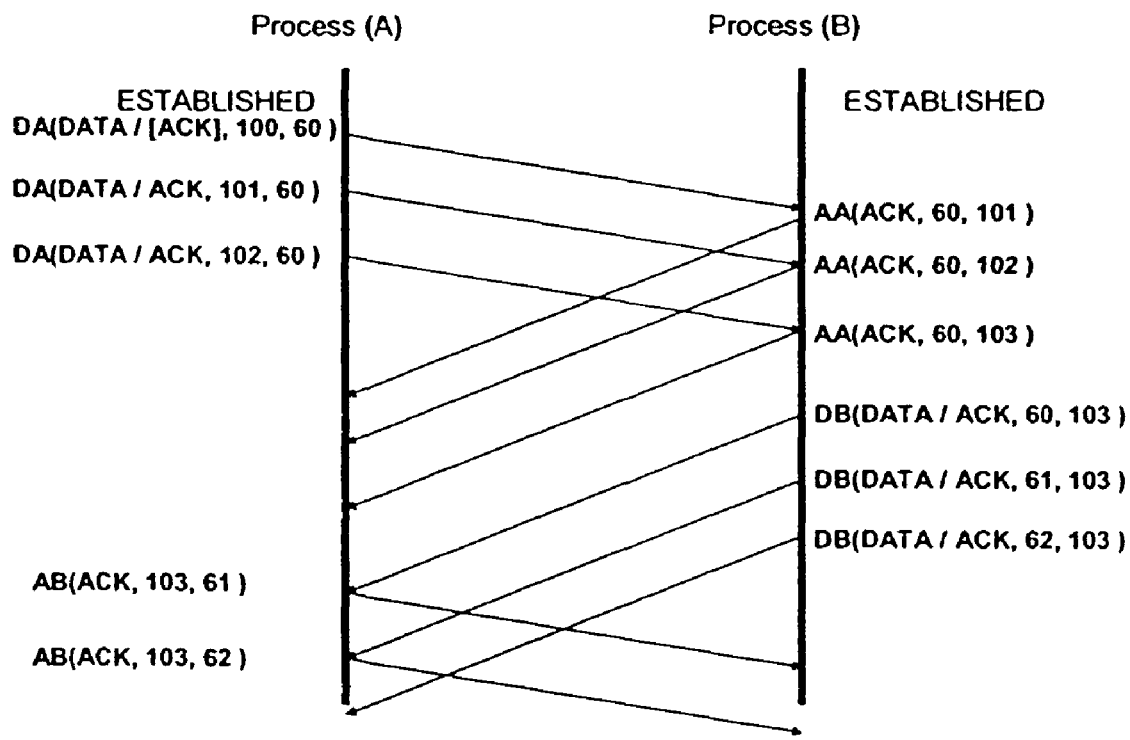
FIG. 10 depicts a data transmission scenario during streaming service of the network-level protocol of FIG. 1A.

The ACK packet 290 for a corresponding DATA packet 120 need not follow immediately after the corresponding DATA packet. FIG. 10, for example, shows a case where the sending device 20 (Process A) sends three DATA packets, after which three ACK packets from the receiving device 30 (Process B) are sent. Process B then becomes the sending device, transmitting three DATA packets to Process A, which then responds with two ACK packets. The incrementing of the sequence 220 and acknowledgement sequence 230 numbers is also noted in FIG. 10.

If the number of unacknowledged DATA packets 120 exceeds a prescribed limit (referred to herein as "MAX_FLIGHT"), the device 20, 30 sending data packets enters the SEND_WAIT substrate 410, during which the sending device will wait until all unacknowledged packets 90 are acknowledged by the receiving device, at which point the sending device will return to the DATA_TRANSMISSION substrate 400.

If, on the other hand, the receiving device 30 has not received a DATA packet 10 from the sending device 20 within a predetermined time limit referred to herein as "ALIVE_TIMEOUT"), the receiving device transitions to the ALIVE_CHECK substrate 420, and issues ACKR packets 280 every ALIVE_CHECK time period to the second device while awaiting a DATA packet from the sending device for a maximum time limit (referred to herein as "MAX_ALIVE_TIMEOUT"). If a DATA packet is received from the sending device before MAX_ALIVE_TIMEOUT EXPIRES, the receiving device returns to the DATA_TRANSMISSION substrate 400, and normal operations resume. Otherwise, the receiving device 30 enters an abnormal disconnection mode by progressing to the CLOSE state 295. In this specific embodiment, ALIVE_TIMEOUT is one second, and MAX_ALIVE_TIMEOUT is eight seconds. Alternate embodiments may vary these values.

Figure 11:
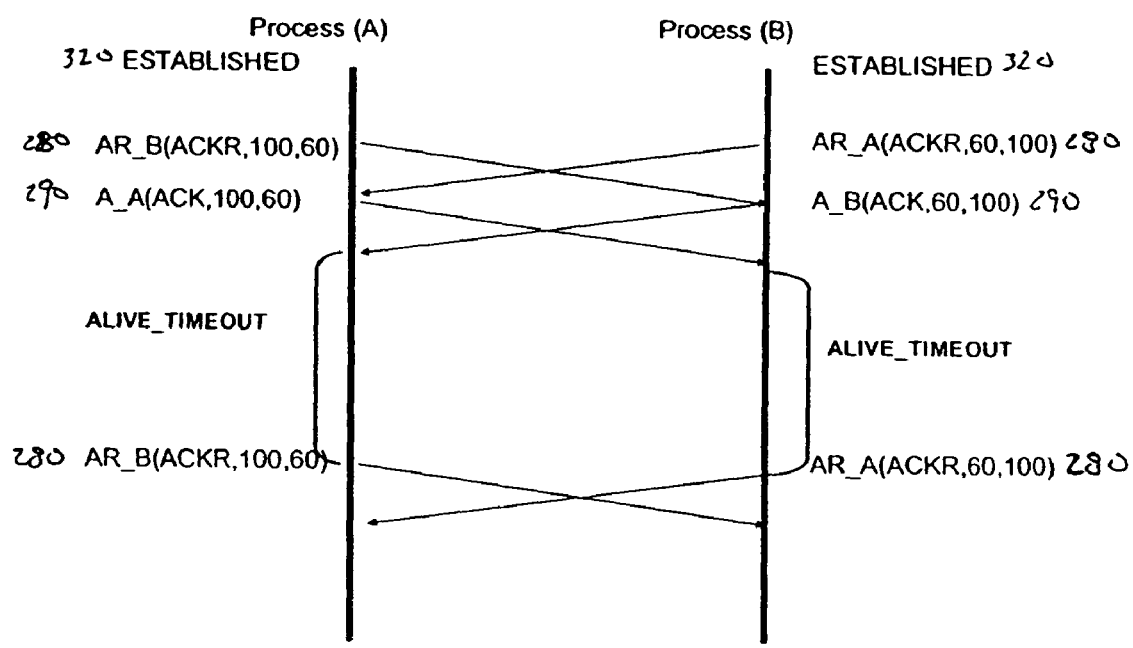
FIG. 11 depicts a communication timeout scenario during streaming service of the network-level protocol of FIG. 1A.

FIG. 11 shows one possible scenario invoking the ALIVE_TIMEOUT. A device 20, 30 at each end of a connection or networks 50 issues an ACKR packet 280 to the other device. In response, each device issues an ACK packet 290. Since each device expects the other to issue a DATA packet 120, no packets 90 are transferred between the two devices 20, 30 until the ALIVE_TIMEOUT time period since the last received ACK packet 290 (is attained. At that point, each device issues ACKR packets 280 to the other device once again.

Returning to FIG. 9, from the perspective of the sending device 20, if an ACK packet 290 from the receiving device 30 for any DATA packet 120 has not been received within a time period RETRANSMISSION_TIMEOUT (which is 200 milliseconds in one embodiment of the invention), the sending device enters the RETRANSMISSION substrate 430, retransmits the first DATA packet in the sequence that has not been acknowledged, and waits for an ACK packet from the receiving device. This retransmission resets the RETRANSMISSION_TIMEOUT. If an ACK 290 has not been received for any of the outstanding DATA 120 packets within a time period MAX_RETRANSMISSION_TIMEOUT after the retransmission of the corresponding DATA packet, the sending device 20 enters the CLOSE state 295. In this particular embodiment, MAX_RETRANSMISSION_TIMEOUT is 8 seconds.

The rate of retransmission may be altered in at least two ways in certain embodiments of the invention. First, as opposed to remaining a constant of 200 milliseconds, the RETRANSMISSION_TIMEOUT may be altered in proportion to the number of packets 90 retransmitted and/or the round trip time of a packet across the network. Secondly, the rate of retransmission may be reduced in inverse relation to the number of outstanding packets 90 without an acknowledgement. Such modification of the RETRANSMISSION_TIMEOUT may slow down retransmission at times of increased packet traffic over the network, thus reducing network congestion. The MAX_RETRANSMISSION_TIMEOUT may be similarly changed in alternate embodiments.

Figure 12:
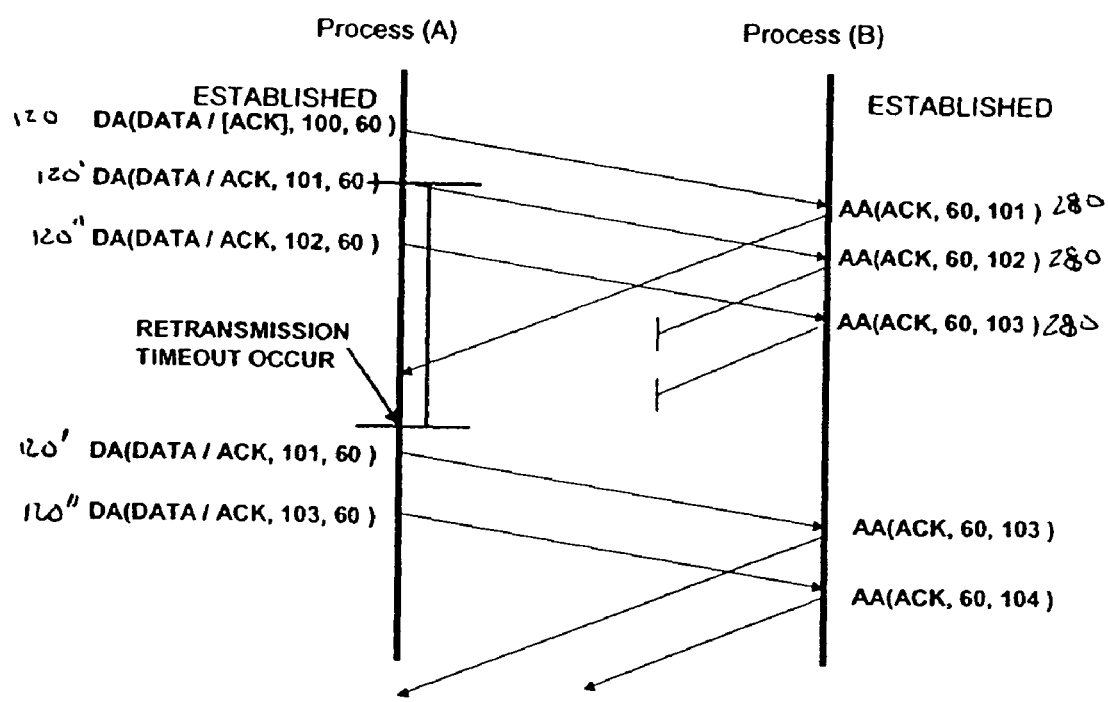
FIG. 12 depicts a communication retransmission scenario during streaming service of the network-level protocol of FIG. 1A.

FIG. 12 depicts a simplified example of a sending device 20 (Process A) transmitting three DATA packets 120, 120$^I$, 120$^{II}$ to a receiving device 30 (Process B). In this example, only the first ACK packet from the receiving devices reaches the sending device. After the time period RETRANSMISSION_TIMEOUT occurs after the first unacknowledged packet has been sent, the second and third DATA packets 120$^I$, 120$^{II}$ are retransmitted, and are subsequently acknowledged by the receiving device.

To provide retransmission flow control outside of the ESTABLISHED state 320 (i.e., during connection or disconnection), the retransmission flow control also applies when an ACK 290 has not been received in response to a CONN 250 or DISC 270 packet within RETRANSMISSION_TIMEOUT.

As mentioned above, abnormal disconnection during the ESTABLISHED state 320 occurs in at least either of two cases: (1) a receiving device 39 has not received any expected DATA packets 120 from a sending device 20 within MAX_ALIVE_TIMEOUT; or (2) a sending device has not received an ACK packet 290 from a receiving device in response to a previously sent packet 40 within MAX_RETRANSMISSION_TIMEOUT.

Figure 13:
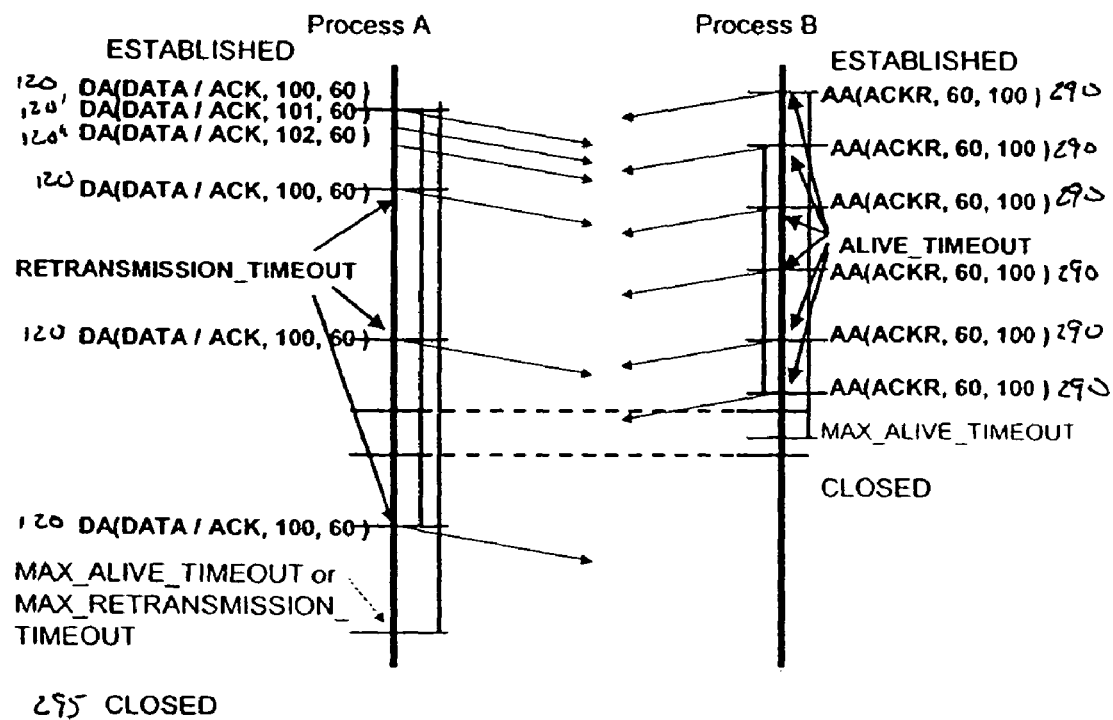
FIG. 13 depicts an abnormal disconnection scenario during streaming service of the network-level protocol of FIG. 1A.

FIG. 13 shows a scenario in which neither sending 20 nor receiving device 30 can communicate with its counterpart, causing both to abnormally disconnect. The sending device (Process A) sends three DATA packets 120, 120$^I$, 120$^{II}$, none of which reach the receiving device (Process B). Each time a RETRANSMISSION_TIMEOUT period occurs thereafter, the sending device retransmits the first unacknowledged DATA packet 120, up to the overall MAX_RETRANSMISTION_TIMEOUT period, at which point the sending device enters the CLOSE state 295. As noted in FIG. 13, the sending device also may be expecting DATA packets 120 from the receiving device 30, thus also encountering the MAX_ALIVE_TIMEOUT time limit, although that portion of the scenario is not demonstrated in FIG. 13 for the sake of simplicity.

During the same time period, as none of the DATA packets 120, 120$^I$, 120$^{II}$ are reaching the receiving device 30, the receiving device periodically issues ACKR packets 280 to the sending device after each ALIVE_TIMEOUT period, up to the MAX_ALIVE_TIMEOUT time period, at which point the receiving device abnormally disconnects and transitions to the CLOSE state 295.

Datagram Service

As an alternative to the stream service, the low-level network protocol layer 40 may provide a datagram service, which, unlike stream service, does not necessarily support a connection-oriented mechanism, transmission flow control or error recovery, as no control flags (such as CONN 250, DISC 270, DATA 260, ACK, and ACKR) are implemented. Accordingly, the datagram service also may not exhibit the transmission overhead associated with the stream service. Also, implementation of broadcast messaging may be facilitated due to a lack of a requirement for ACK packets 290 from the recipient devices in the datagram service.

Figure 14:
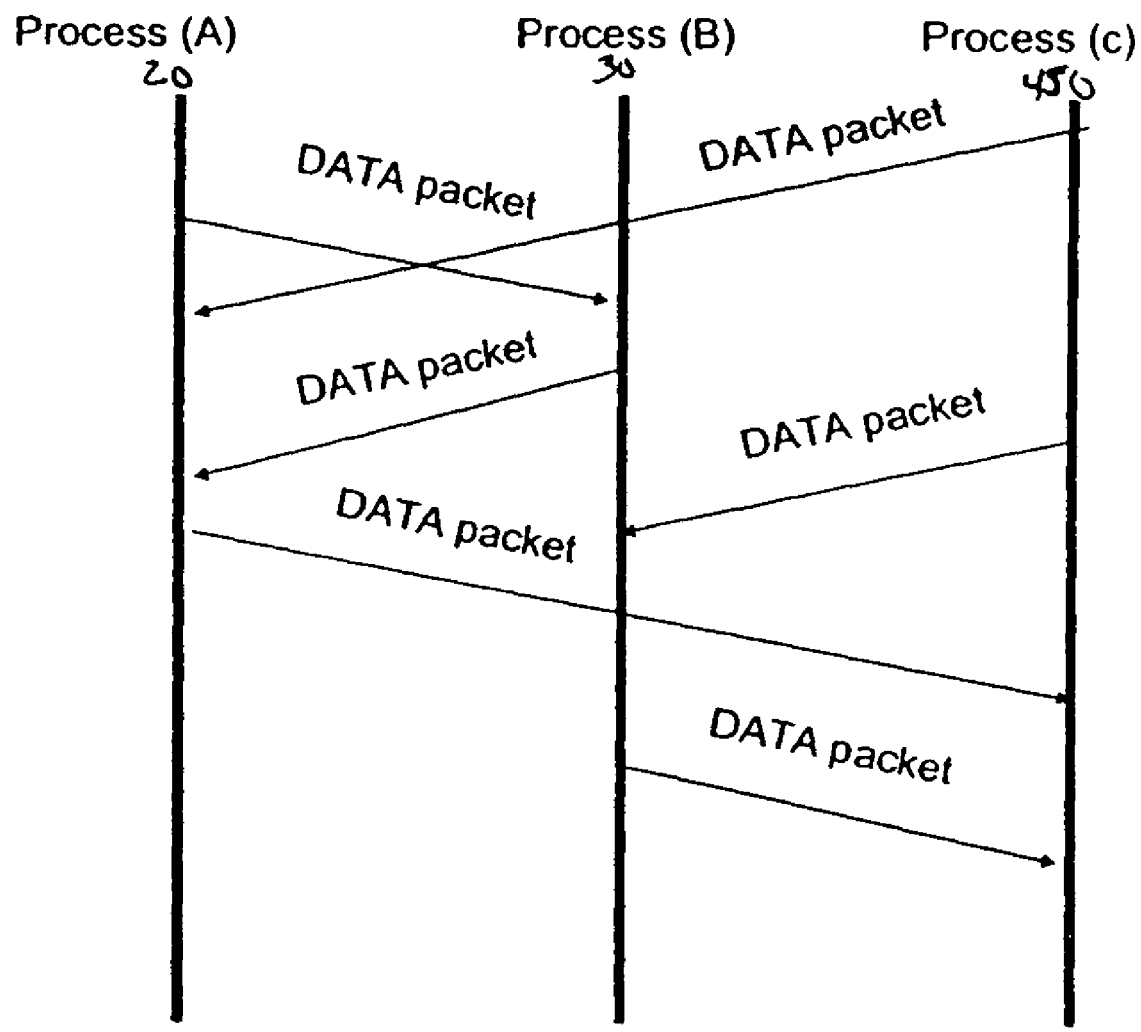
FIG. 14 depicts a data transmission scenario during a datagram service of the network-level protocol of FIG. 1A.

FIG. 14 provides a simplified example of three devices on a network 20, 30, 450 (Processes A, B and C) sending DATA packets 90 to each other. Noted are the lack of CONN 250, DISC 270, ACK 280, and ACKR 290 packets for making connections, controlling data flow, and so forth. Each process 20, 30, 450 examines the destination MAC address 130 within the Ethernet-type header 100 to determine if the process is to read that particular packet. Each device also accepts packets 90 with destination MAC addresses 130 denoting packets broadcast to all devices 20, 30 on the network 30 (i.e., FF:FF:FF:FF:FF:FF).

Figure 16:
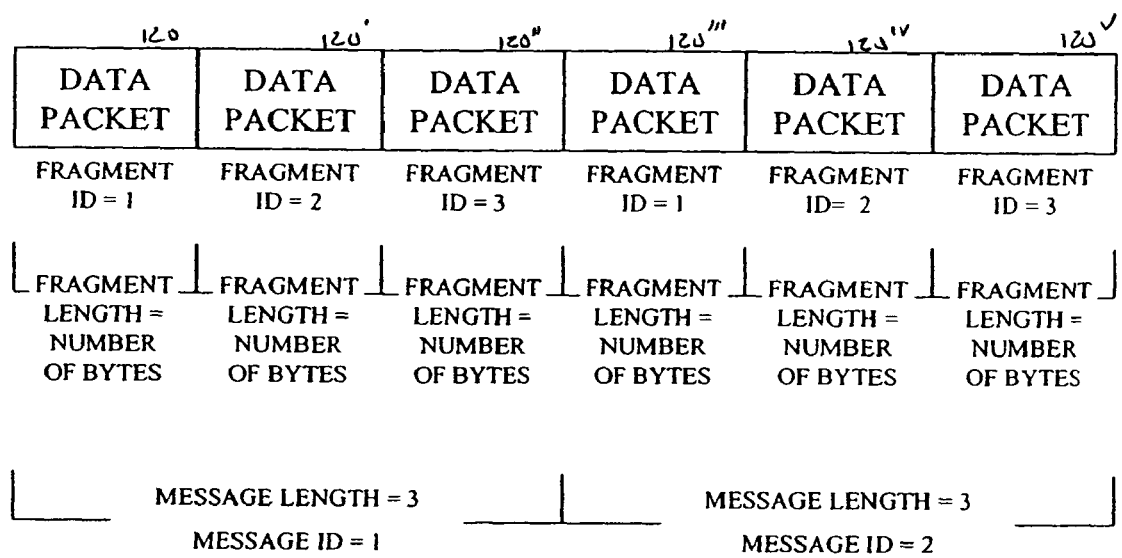
FIG. 16 depicts an example of the organization of messages, fragments, and packets during datagram service of the network-level protocol of FIG. 1A.

FIG. 15 displays a diagram of the network-level header 110$^1$ specific to the datagram service, denoted by the two-bit type field entry 0x02 160$^1$. The two-byte source 190$^1$ and destination 100$^1$ ports serve the same function as in the network-level header 110 for the stream service. Also included in the header 110$^1$ are two-byte fields for each of a message ID 160 and message length 470 (stated as a number of fragments or DATA packets), as well as a fragment ID 480 and fragment length 490 (stated as a number of data bytes). Stated another way, each message 90 from a sending device 20 may consist of several fragments or DATA packets 120, wherein each fragment consists of a number of bytes within a DATA packet. The value of the message ID 460 and fragment ID 480 fields should each be equal to or greater than one in the perfect embodiment but may vary in alternate environments. These values provide the device 30 receiving a DATA packet 120 with information as to how the various DATA packets are to be reassembled within the receiving device, as no guarantee exists that the DATA packets will arrive at the receiving device in order. For example, all DATA packets 120 with the same message ID 460 and same fragment ID 480 are reassembled by the receiving device, first in order of message ID, and then within order of fragment ID within each message ID. The message 470 and fragment 490 lengths indicate the number of fragments or data bytes, respectively, that comprise the particular message or fragment. FIG. 16 shows a reassembled set of data packets 120, 120$^I$, 120$^{II}$, 120$^{III}$, 120$^{IV}$, 120$^V$ corresponding to two messages, each fragmented into three DATA packets, possibly of varying size.

Next Generation Service

As mentioned above, future support for a next generation service has been provided for within the network-level protocol layer 60. Enhancements, such as the ability to provide varying levels of Quality of Service (QoS), may be implemented within such a service.

Figure 17:
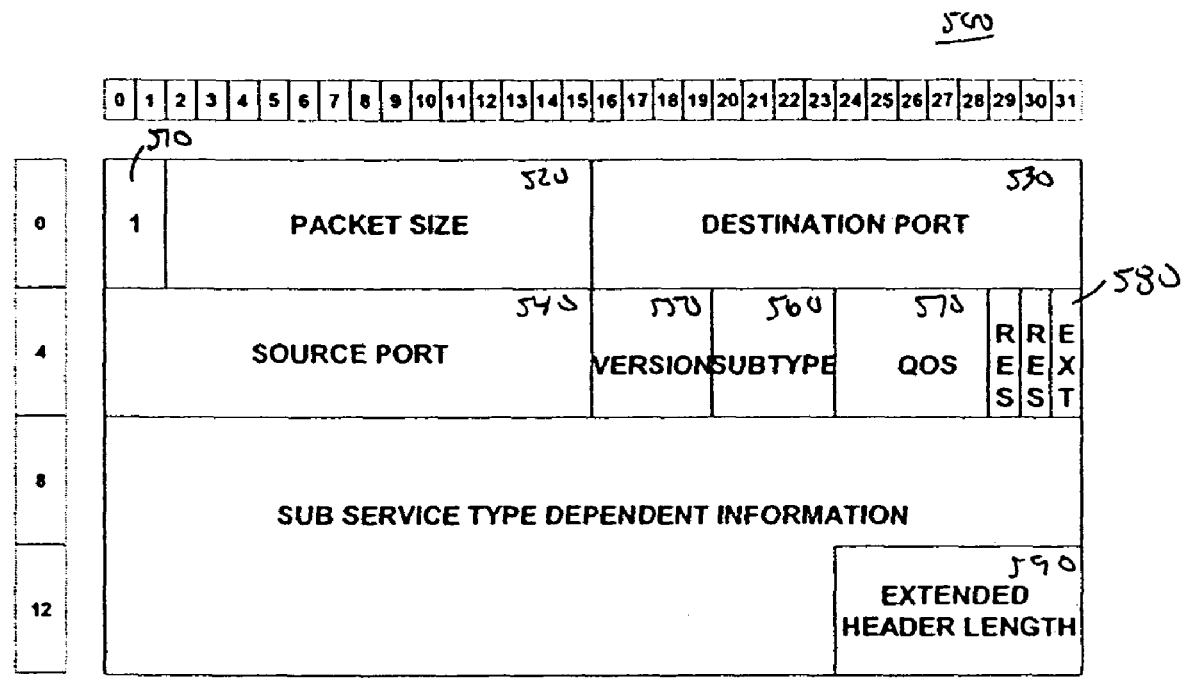
FIG. 17 depicts the general header format of the next generation service of the network-level protocol of FIG. 1A.

FIG. 17 depicts the network-level header 500 specific to the next generation service, indicated by a 0x01 in the two-bit type field 510. The packet size 520, destination port 530, and source port 540 (as used in the general network-level header 110) remain the same. In addition, a four-bit version field 550, a four-bit subtype field 560, a five-bit QoS field 570, an "extended" (EXT) control flag 580, and a one-byte extended header length field 590 are supplied. Various subservice-dependent information may be also provided in the header.

The version field 550 specifies a version number of the next generation service corresponding to the particular packet 90 in question, thus allowing devices 20, 30 on the network 50 to determine whether they have the capacity to implement the functions indicated in the packet. The sub-type field 560 indicates the specific type of subservice of the next generation service to be supported in interouting with the packet. The QoS field 570 identifies the level of QoS (Quality of Service) service, such as a minimum data throughput or maximum data latency, to be provided by the device 20, 30 in conjunction with the packet 90. Finally, the EXT flag 580 indicates whether an extended header is involved in the packet, and if so, the length of the extended header, which is generally contained in the extended header length field 590.

Figure 18:
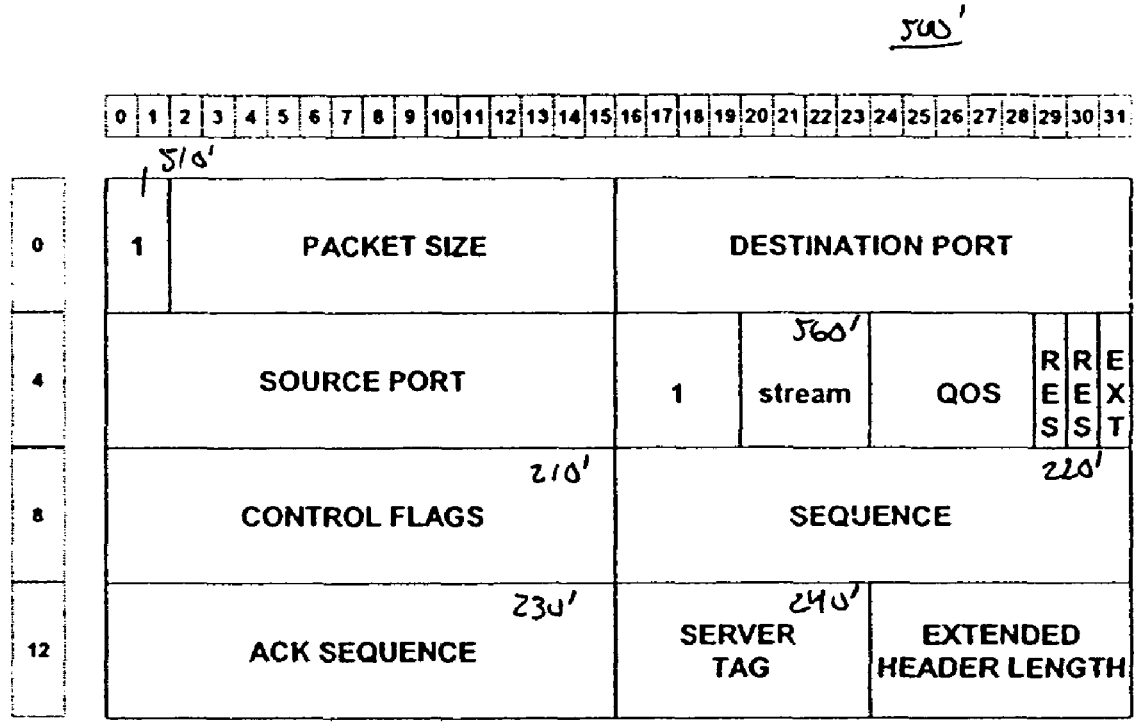
FIG. 18 depicts the header format for a stream subservice of the next generation service of the network-level protocol of FIG. 1A.

Two of several possible subservices supported by the next generation service 500 are the next-gen stream and datagram services, both similar in some respect to their current counterparts, which were already described in detail. FIG. 18 provides a diagram of the next generation header 500 for the next-gen stream subservice, which is identified in the subtype field 560$^I$ with a specific value (labeled "stream" in FIG. 18). As before, two bytes of control flags 210$^I$, a two-byte sequence number 220$^I$, a two-byte acknowledge sequence number 230$^I$, and a one-byte service tag 240$^I$ are provided to implement the next-gen stream subservice.

Figure 19:
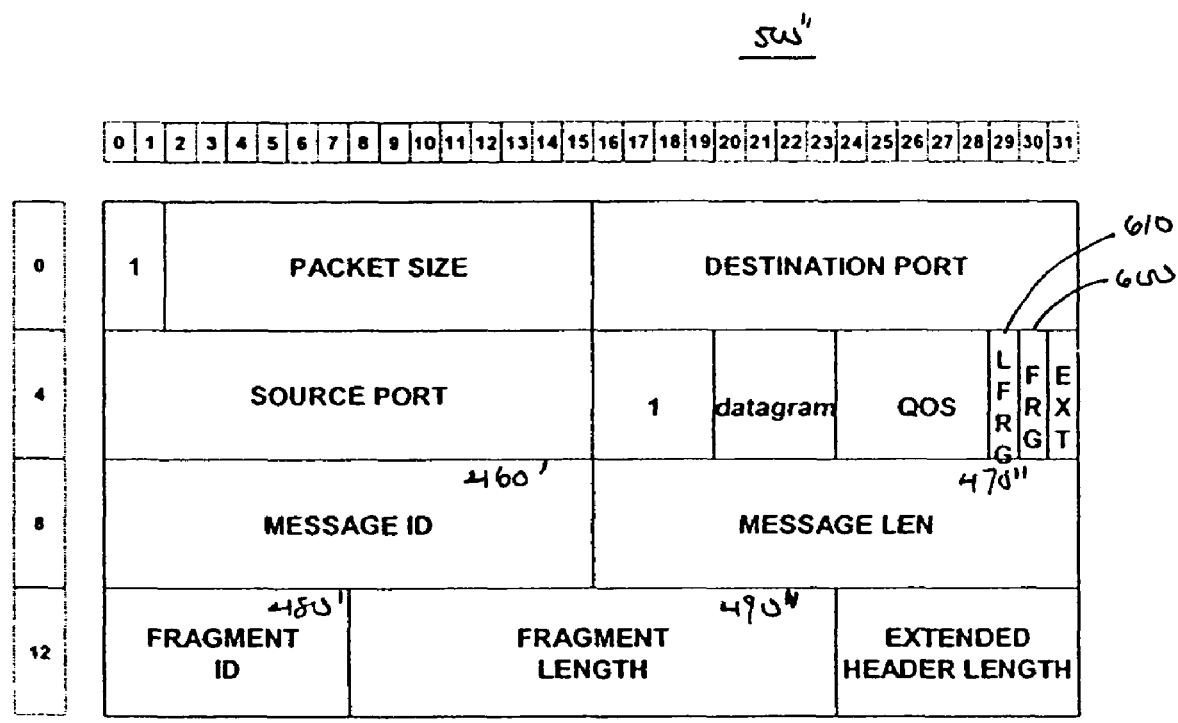
FIG. 19 depicts the header format for a datagram subservice of the next generation service of the network-level protocol of FIG. 1A.

Likewise, FIG. 19 shows the next generation header 500$^{II}$ specific to the next-gen datagram subservice. As before, two-byte message ID 460$^I$, message length 470$^I$, and fragment length 490$^{II}$ fields are provided. The fragment ID field 480$^I$, however, has been reduced to one byte to maintain the size of the next generation header 500$^{II}$ at 16 bytes. In addition, a "fragmented" (FRG) control flag 600 is provided to indicate whether the current packet is fragmented, and a "last fragment" flag 610 is supplied to denote whether the current packet 90 is the last fragmented packet of the message.

3. The Device-Level Protocol Layer

Atop the network-level protocol 40 is the device-level protocol layer 60 (shown in FIG. 1A) which allows communication between two devices 20, 30 over a network 50 at a level appropriate for the devices. Thus, the device-level protocol layer 60 minimizes unnecessary communication overhead, focusing on transferring information pertinent to the tasks required by the devices to implement device-specific functions. Such a lean and efficient protocol is made possible by the increasingly reliable nature of today's networks.

The specific device-level protocol 60 described below provides an implementation of the Integrated Drive Electronics (IDE) interface, a widely-used interface between a host computer 20 and most magnetic hard disk drives and other storage or peripheral devices 30. In addition, the protocol 60 may implement the AT Attachment Packet Interface (ATAPI), which is a popular interface for use with CD-ROM, DVD-ROM and tape drives. This protocol is suitable for communication with Network Direct Attached Storage (NDAS) device products sold by XiMeta Incorporated of Irvine, Calif., among other IDE or ATAPI products. However, other device-level interfaces for devices 20, 30 attached directly to a network 50 may be implemented in a similar device-level protocol using the concepts disclosed in conjunction with the various embodiments of the present invention. For example, device-level protocols incorporating Enhanced IDE (EIDE), the Small Computer System Interface (SCSI) and its progeny, and other magnetic and optical storage device interfaces may be produced for communication between a host computer and a device directly attached to a network using the inventive concepts disclosed herein. Also, the device-level protocol may not be limited to data storage devices, but instead may encompass interfaces directed to other types of electronic devices, such as printers, audio/video players, personal digital assistants (PDAs) and so on.

The device-level protocol 60 of the disclosed embodiment 10 provides a set of four basic device-level protocol commands for storage devices: LOGIN, LOGOUT, TEXT, and IDE. LOGIN initiates the formation of a session between a host computer and a storage device 30 over the network. Conversely, LOGOUT terminates an ongoing session between two devices. (Termination of a session is distinguished from the termination of a connection in the network-level protocol layer, which is unaffected by the LOGIN and LOGOUT commands of the device-level protocol layer.) The TEXT command allows a device to obtain status from another device. Finally, the device-level protocol IDE command allows a device to issue one or more IDE commands to a device using the device-level protocol.

Figure 20:
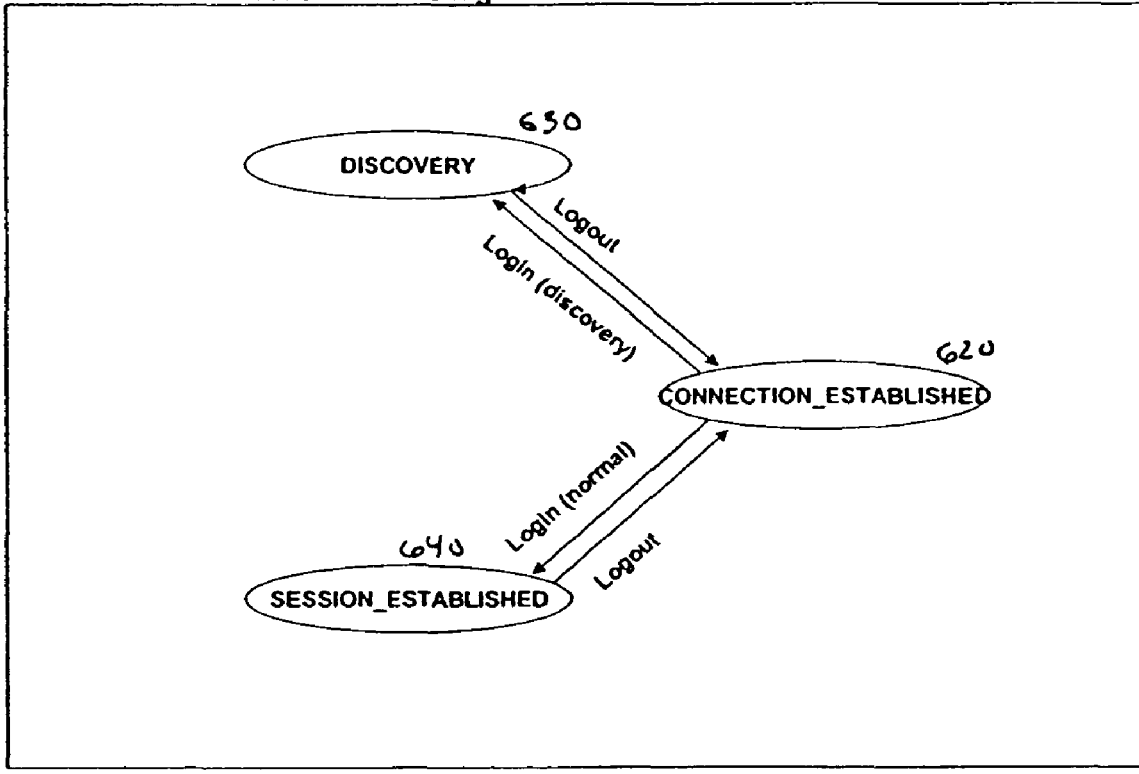
FIG. 20 is a state transition diagram for the device-level protocol of FIG. 1A.

FIG. 20 depicts a state diagram of the device-level protocol 60. Once the host device 20 and the remote device 30 enter the ESTABLISHED state of the network-level protocol 40, the host and the remote device both reside within the CONNECTION_ESTABLISHED state 620 of the device-level protocol.

If the host 20 then merely requires some capacity information (described below in conjunction with the TEXT_REQUEST command) from the remote device 30, the host issues a quick and efficient "discovery" LOGIN command, thus causing the transition of the host and the remote device to the DISCOVERY state 630. During the DISCOVERY state 630, the host 20 and the device 30 may send and receive information from each other using TEXT commands, after which the host issues a LOGOUT command to return itself and the remote device to the CONNECTION_ESTABLISHED state 620. In sum, the DISCOVERY state 630 facilitates a fast method for a host and remote device to exchange capacity information, time of last read and/or write operation, the number of hosts with read and/or write privileges to the remote device, power status, and the like.

Further communication between the host 20 and remote device 30, typically in the way of IDE commands, status, and data transfer, is generally preceded by the host issuing a more secure and robust "normal" LOGIN command, thereby transitioning the host and the remote device to the SESSION_ESTABLISHED state 640, during which IDE-related operations between the host and the remote device may occur. Once no more IDE-level communication is desired, the host 20 (or possibly device 30) issues a LOGOUT command to place the host and the remote device back into the CONNECTION_ESTABLISHED state 620.

Figure 21:
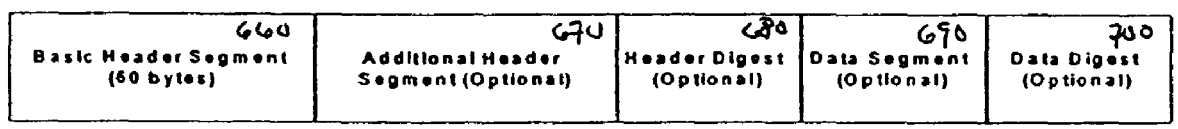
FIG. 21 depicts the general packet format of the device-level protocol of FIG. 1A.

FIG. 21 displays the general format of the device-level protocol packet 650, which resides within the data frame 120 of the network-level protocol packet 90 format shown in FIG. 2. The device-level protocol packet consists of 60 bytes of basic header segment 660, followed by optional fields of additional header segment 670, header digest 680, data segment 690, and data digest 700. The additional header segment 690 and data segment provide areas for additional data values and accompanying data that may be required for some commands. In one embodiment, the data contained with a data segment is not user data, but actually data required as part of the authentication process utilized during the log-in procedure, explained below. The header digest 680 and data digest fields 700, if used, typically contain error detection or correction data for the header and data segments, respectively. Those values may represent a simple cyclic redundancy check (CRC) value, a more complex error correction code (ECC) value, or the like.

The basic header segment 660 can take one of two basic forms: a general request header 710 issued from a host 20 to a remote device 30 (shown in FIG. 22), and a general response header 720 from a remote device to the host (displayed in FIG. 23). The one-byte operation code 730 identifies the particular request or response device-level protocol command being sent. In the present embodiment, the various request and response operation codes are as follows:

LOGIN_REQUEST 0x01
LOGOUT_REQUEST 0x02
TEXT_REQUEST 0x03
IDE_REQUEST 0x08
LOGIN_RESPONSE 0x1
LOGOUT_RESPONSE 0x12
TEST_RESPONSE 0x13
IDE_RESPONSE 0x18

Concerning the remainder of the fields shown, the definitions of the one-byte flag fields of both the response 720 and the request 720 header formats are request- and response-sensitive. The host session identifier (HSID) 740, remote session identifier (RSID) 750, and the sub-session number (SSN) 760 fields allow more complex session processing. The host device 20 assigns a session identification number to the connection between the host and remote devices, as does the remote device 30. These identification numbers are included in all protocol packets as the HSID 740 and RSID 750, respectively. The SSN 760 is employed to indicate a "child" process created from a "parent" process. Normally, the child process inherits the all of its session information (including the HSID, RSID, port numbers, and so on) from the parent process, and executes a separate set of commands with the same remote device connected with the parent process. The remote device thus utilizes the SSN to determine whether it is engaged with the parent process or the child process. The data segment length 770 and the total additional header segment (AHS) 780 length fields specify the lengths of the optional additional header segment 670 and the optional data segment 690, respectively, in the device-level packet 650 shown in FIG. 21.

The path command tag 790 and the command sub-packet sequence number 800 identify portions of device-level protocol commands consisting of multiple requests and replies, such as the LOGIN command described in greater detail below. More specifically, the path command tag identifies the command sequence being executed, while the command sub-packet sequence number specifies the current step of the identified command sequence.

Further with respect to the general request and response formats 710, 720, the initiator task tag 810 allows a device to distinguish between different commands that may logically be categorized within the same or similar task group. For example, the initiator task tag 810 can be given different values for an IDE write command and a SCSI write command, which then allows a remote device 30 that supports both types of interfaces to determine which type of write command the host 20 intends. Commands meant for different classes of devices, such as write commands for hard disk drives and printers, may be distinguished in the same manner. The data transfer length field 820 denotes, in bytes, the length of data to be transferred by the command.

The target ID (TID) 830 and the logical unit number (LUN) 840 are IDE-specific constructs employed to identify a particular remote device or portion of a remote device for a command. Typically, a remote device may consist of multiple targets, while each target may have multiple LUNs 840.

In addition, the general response command format 720 contains a one-byte response field 850, as well as a one-byte status field 860 that is reserved for future use. The status field 860 represents the current status of the device 20, 30, such as, for example, the value of the status register of an IDE hard disk drive. The response field 850 indicates the current operation's status, as viewed by the remote device. The definitions of the various values for the response field are as follows, where "RO" indicates the status of the device itself as a result of the command, while "T" signifies the status of the command that prompted the response:

| | |
|---|---|
| RESPONSE_SUCCESS | 0x00 |
| Device successfully completed command | |
| RESPONSE_RI_NOT_EXIST | 0x10 |
| Device does not exist | |
| RESPONSE_RI_BAD_COMMAND | 0x11 |
| Device does not recognize command | |
| RESPONSE_RI_COMMAND_FAILED | 0x12 |
| Device could not complete command | |
| RESPONSE_RI_VERSION MISMATCH | 0x13 |
| Device protocol does not match that of command | |
| RESPONSE_RI_AUTH_FAILED | 0x14 |
| Log-in authorization failed | |
| RESPONSE_T_NOT_EXIST | 0x20 |
| Command does not exist | |
| RESPONSE_T_BAD_COMMAND | 0x21 |
| Field within command is not discernible | |
| RESPONSE_T_COMMAND_FAILED | 0x23 |
| Command did not execute successfully | |
| RESPONSE_T_BROKEN_DATA | 0x24 |
| Data within command is corrupted | |

Figure 24:
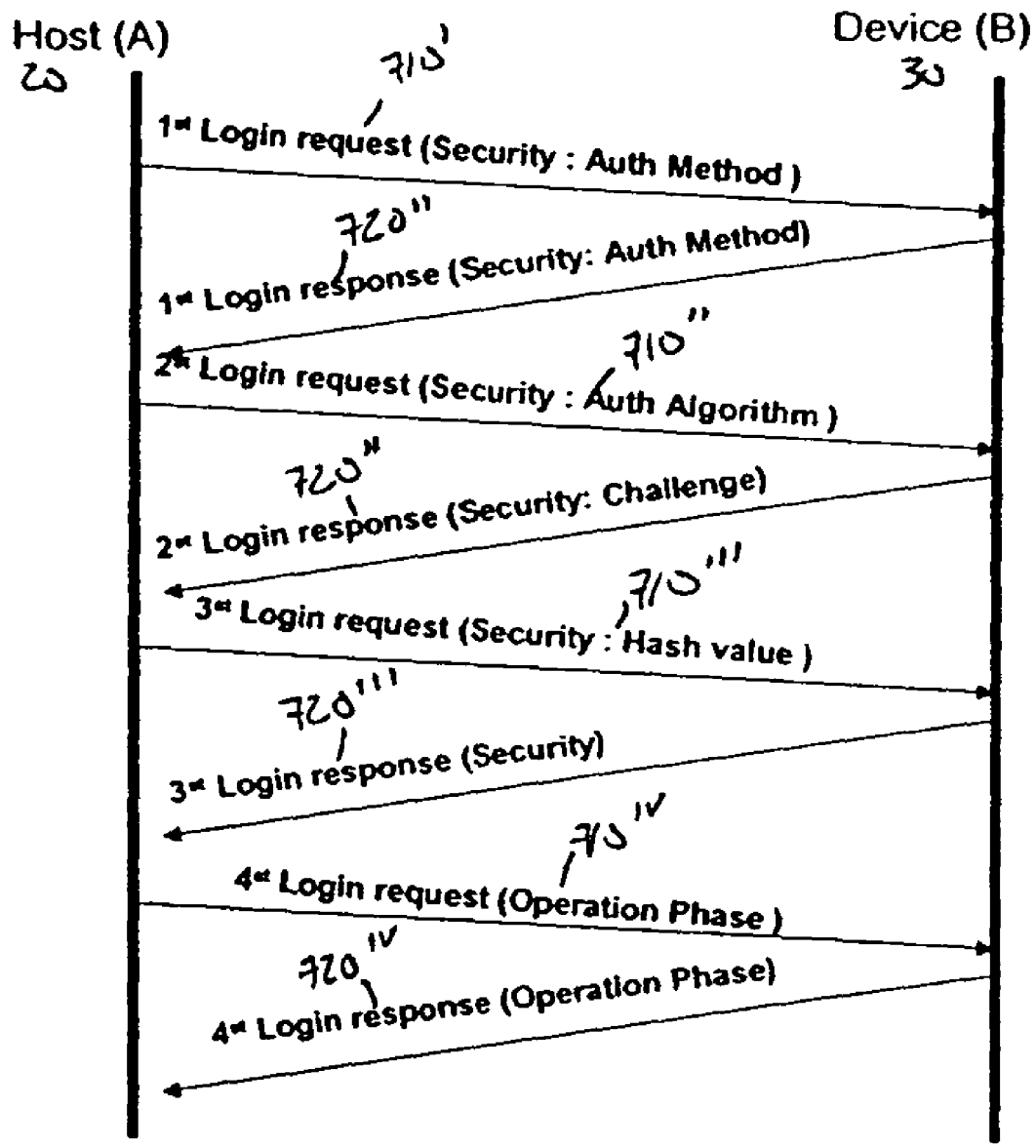
FIG. 24 depicts the request/response packet exchanges involved in a LOGIN sequence of the device-level protocol of FIG. 1A.

As mentioned above, the LOGIN command is a multiple stage operation consisting of four request packets 710 issued by the host 20 to the remote device 30, interspersed with four response packets 720 from the remote device to the host, as shown in FIG. 24. Generally speaking, the first three request/response exchanges provide a secure method for establishing a session between the host and the remote device, while the final exchange implements a log-in procedure negotiation.

More specifically, the host 20 issues the first LOGIN request packet $710^I$ to obtain information regarding the authentication methods available in the remote device 30 to establish the session. Also included is an indication whether the host is requesting a "discovery" or "normal" log-in. The first LOGIN response packet $720^I$ from the remote device informs the host of the authentication methods available. The next request packet $710^{II}$ from the host indicates the authorization algorithm selected by the host, followed by the response packet from the remote device delivering the actual challenge phrase to be employed. The host 20 then issues a request packet $710^{III}$ with the proper hash value for responding to the challenge, to which the remote device 30 replies with a packet $720^{III}$ indicating whether the hash value was successful, thus authorizing use of the remote device by the host and completing the security phase of the LOGIN command. The host 20 then submits a request $710^{IV}$ containing an indication of possible operations to be executed in the actual log-in procedure, including whether encryption will be used on the packets 90 to be exchanged between the host and the remote device 30. The remote device then responds in yet another response packet $720^{IV}$ with the specific operations, including a decision on encryption use, that will effect the log-in. At this point, the host and the remote device transition to either the DISCOVERY state or the SESSION_ESTABLISHED state.

Figure 25:
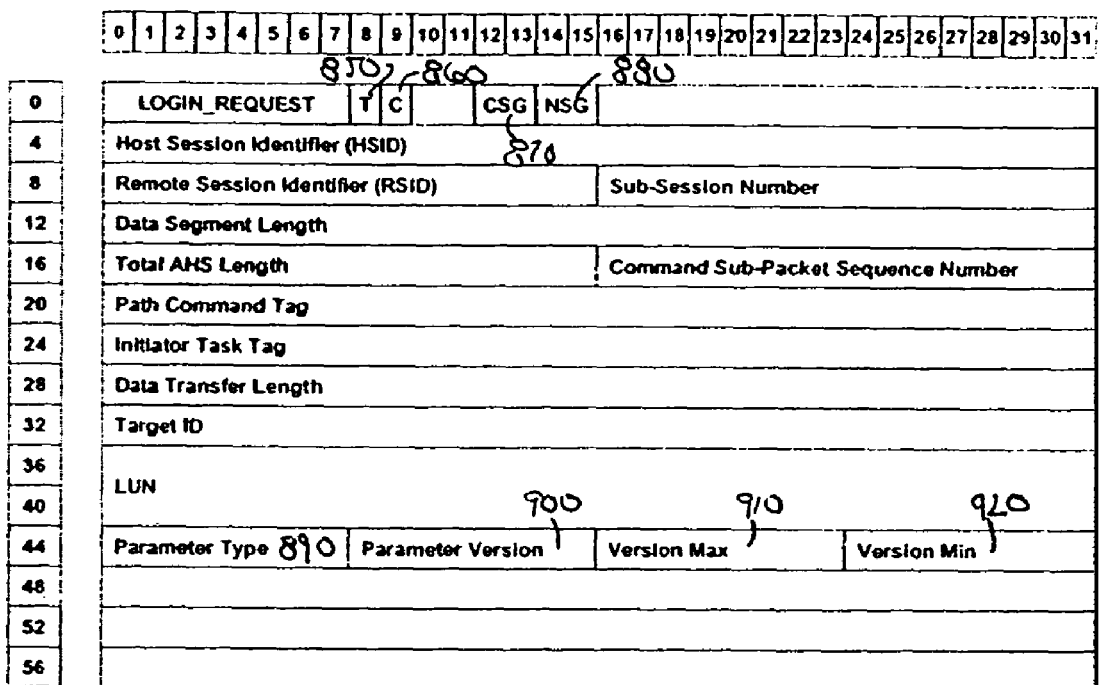
FIG. 25 depicts the header format for the LOGIN_REQUEST command of the device-level protocol of FIG. 1A.

The LOGIN command request format $710^I$, is shown in FIG. 25. Specific to the LOGIN command are four control flags: Transit (T) 850, Continue (C) 860, Current Stage (CSG) 870 and Next Stage (NSG) 880. The Current Stage and Next Stage flags 870, 880 take on one of three possible values indicating the various stages of the LOGIN process: Security Negotiation (0x00), Login Operation Negotiation (0x01), and the Full Feature Phase (0x02) (i.e., the log-in procedure is complete). The Transit flag 850 is set if the LOGIN stage is changing from that denoted by the Current Stage to the Next Stage. Alternately, the Continue flag 860 is set when the request/response parameter, such as one that specifies the authorization method, challenge phrase, hash value, and so on (depending on the LOGIN stage), requires multiple request/response packets 710, 720. The one-byte parameter type field 890 indicates whether the current parameter is interpreted as a text parameter (0x00) or a binary parameter (0x01). Further, a one-byte parameter version field 900 indicates the current version of the parameter, which identifies the location of information represented by the parameter. More specifically, a version 1 parameter indicates data is stored in the additional header segment field 680, while data corresponding to version 0 parameters resides in the data segment 690, as depicted in the general device-level packet format shown in FIG. 21. Alternate embodiments may use the parameter version field 900 to indicate different locations for information.

Additionally, the version max and version min fields 910, 920 indicate the maximum and minimum device-level protocol version currently supported by the host 20 or remote device 30.

Figure 26:
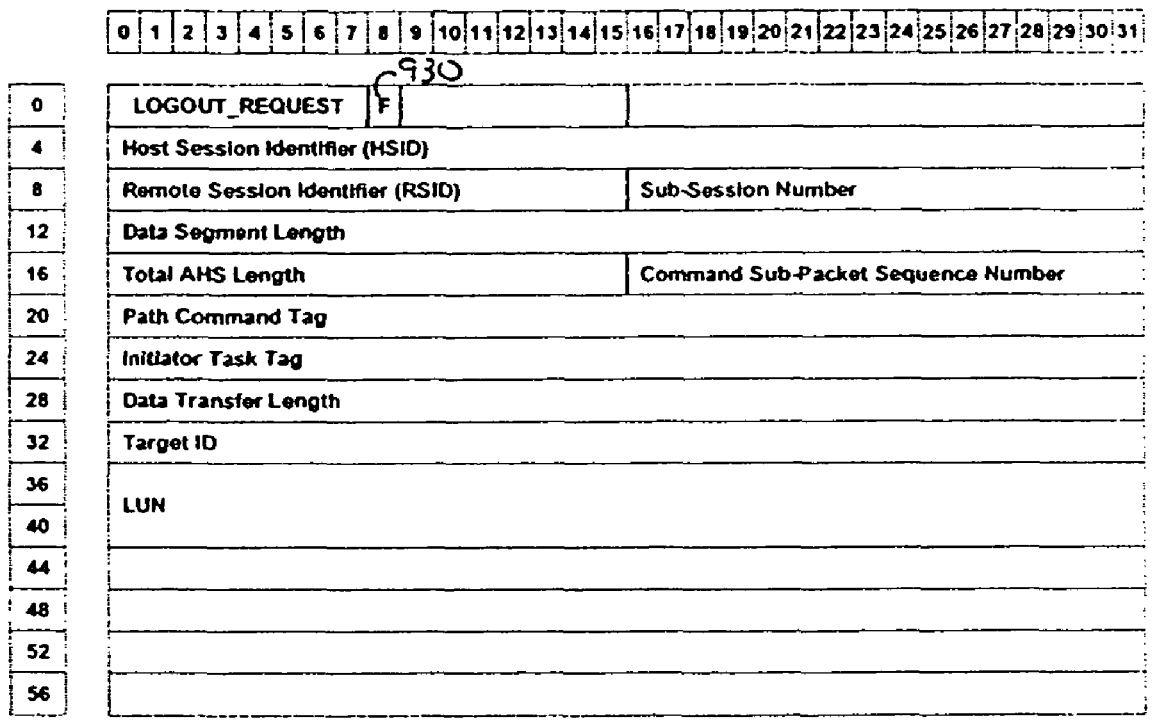
FIG. 26 depicts the header format for the LOGOUT_REQUEST command of the device-level protocol of FIG. 1A.

The LOGOUT command 940 (the request packet format of which is shown in FIG. 26) employs a single special flag field F 930 set to one, indicating that a single request/response exchange is involved. Upon the successful exchange of LOGOUT_REQUEST 940 and LOGOUT_RESPONSE packets, the host 20 and the remote device 30 transition from the SESSION_ESTABLISHED state 640 or DISCOVERY state 630 to the CONNECTION_ESTABLISHED state 640. As with other specific response packets mentioned herein, the LOGOUT_RESPONSE packet format generally follows that of the response packet 720 shown in FIG. 23.

Figure 27:
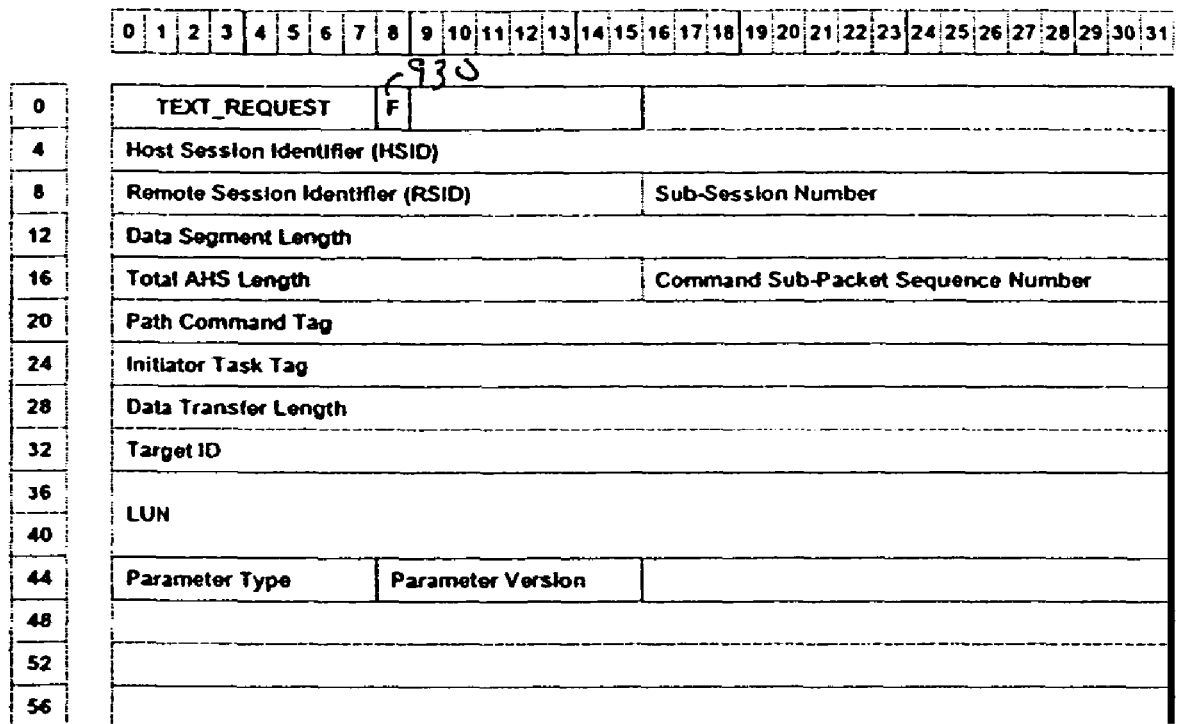
FIG. 27 depicts the header format for the TEXT_REQUEST command of the device-level protocol of FIG. 1A.

FIG. 27 shows the request header format for the TEXT_REQUEST command 950, which is employed by a host 20 to retrieve information from the remote device 30 concerning various aspects of the device.

As with the LOGOUT command 940, a flag F field 930 is set to one to indicate the command employs a singe request/response exchange between the host and the remote device.

Two possible types of data are returned by the remote device 30 in a TEXT_RESPONSE packet (typically issued in reply to a TEXT_REQUEST packet): a TARGET LIST parameter, which identifies the hosts on the network that are currently using the remote device, or a TARGET DATA parameter, which reveals device-specific information. In the case of a storage device, such information may include storage capacity, access time, latency, and so on.

As noted earlier, the TEXT_REQUEST 950 and TEXT_RESPONSE commands are used during the DISCOVERY state 630, which allows the host 20 to obtain information about a remote device 30 prior to establishing a session with the device, which typically involves the secure negotiation and log-in procedure described above. Also, similar to the LOGIN operation, the parameter type and parameter version fields are utilized to identify the particular type and location (additional header segment or data segment) of the parameters being requested.

Figure 28:
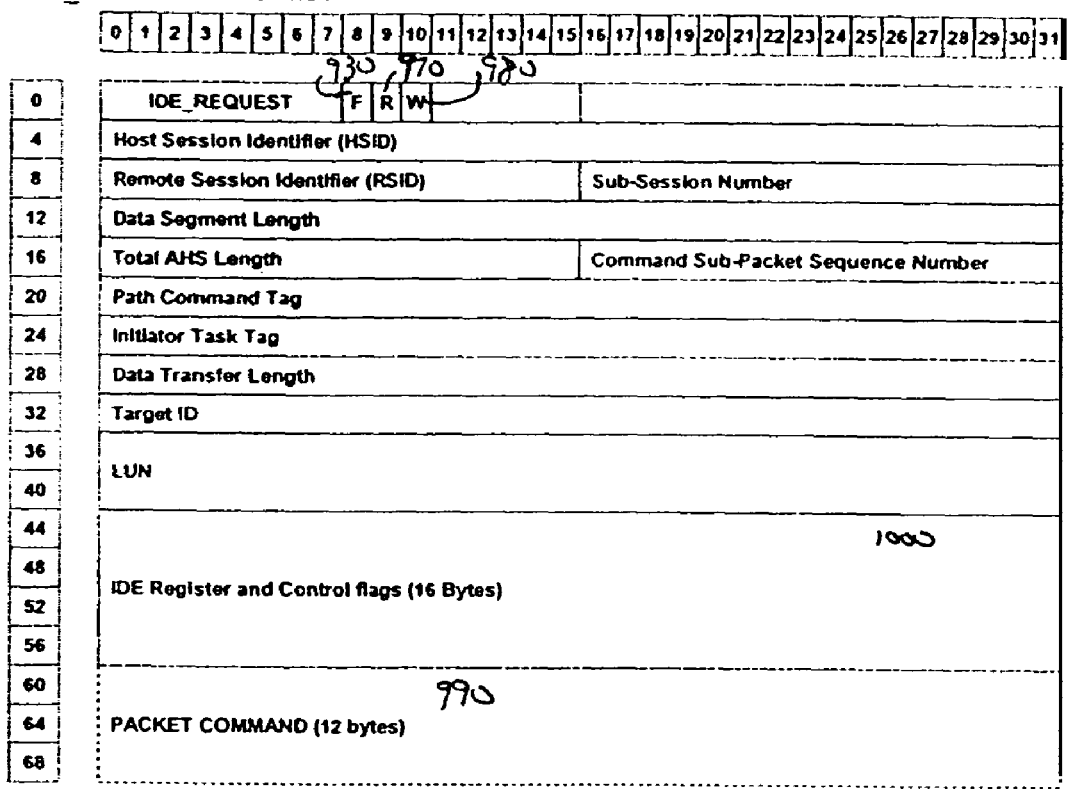
FIG. 28 depicts the header format for the IDE_REQUEST command of the device-level protocol of FIG. 1A.

Once the host 20 and the remote device 30 have entered the SESSION_ESTABLISHED state 640, the IDE_REQUEST and IDE_RESPONSE commands may be employed to perform actual remote device operations, including the transfer of read and write data between the host and a data storage device. FIG. 28 depicts the IDE_REQUEST packet 960 format. A Flag field F 930 is set to one if the current packet being transmitted is the final packet associated with the current command. Also, a Read Flag R 970 and a Write Flag W 980 are supplied to indicate whether the IDE_REQUEST command 960 involves the host 20 reading data from the remote device 30, writing data to the remote device, or neither.

The IDE_REQUEST command 960 supports both standard ATA level commands, which are used primarily for hard disk drives or other storage devices, and ATAPI packet-type commands, which are higher-level, SCSI-like commands implemented generally for CD-ROM, DVD-ROM, and tape drives. To this end, a 12-byte ATAPI packet command field 990 holds an entire ATAPI command in its original form and is implemented within the additional header segment field.

Figure 29:
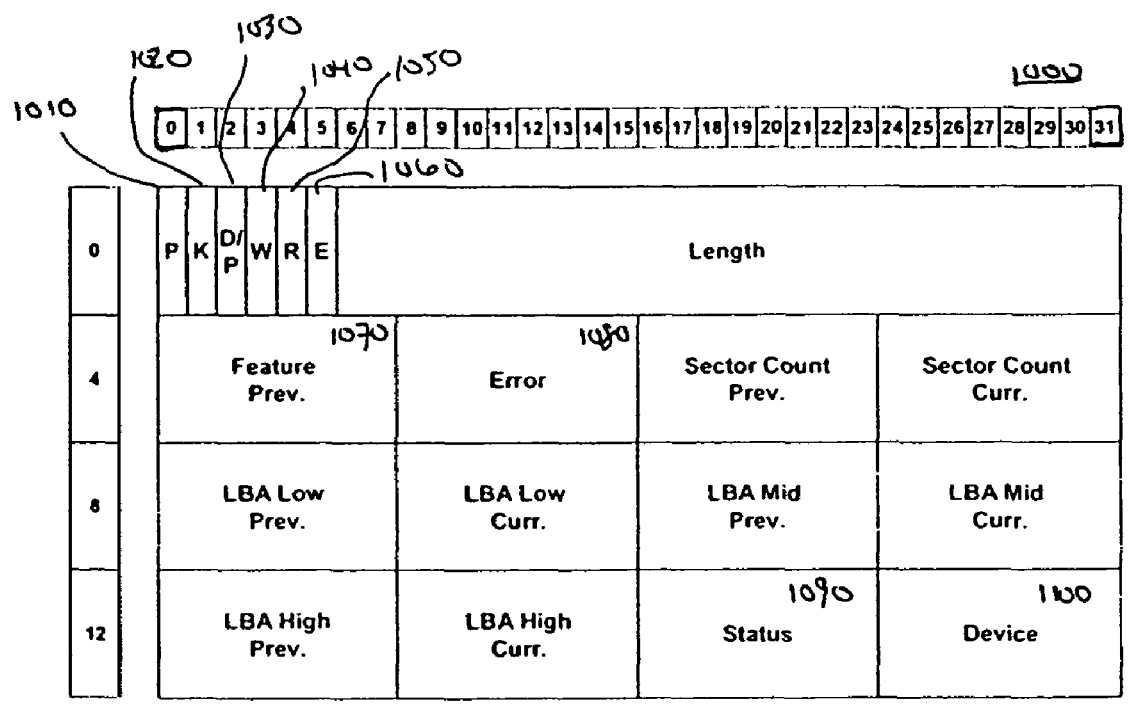
FIG. 29 depicts the IDE register and control flag field of the IDE_REQUEST command header of FIG. 28.

Further, within the main portion of the IDE_REQUEST format 960 lies 16 bytes of IDE register and control flag information 1000, shown in detail in FIG. 29. Several flags are provided, such as the Packet (P) flag 1010. This flag is set to one for ATAPI packet commands, and to zero for standard ATA-level commands. The K flag 1020 may indicate the presence of additional information regarding, for example, a key value associated with a key exchange operation in DVD commands. The DMA/PIO (D/P) flag 1030 indicates whether data transfers are accomplished in Direct Memory Access (DMA) mode or in Programmed Input/Output (PIO) mode. The Read (R) and Write (W) flags 1050, 1040 indicate whether an IDE read or write operation is being invoked. The Extended (E) flag 1060 denotes use of the "extended" ATA commands, such as the Extended Read and Extended Write commands.

Some byte-wide fields, such as the feature previous, error, status, and device fields 1070, 1080, 1090, 1100, are supplied to indicate the current status of the remote device 30, any outstanding errors that have occurred, and the like.

Several larger fields are also supported to indicate the location and extent of a data transfer between the host and the remote device. For example, previous and current Logical Block Addresses (LBAs), which are logical addresses of physical sectors or blocks on the storage medium of the remote device, are maintained to track the progress of a data write or read transfer requiring multiple IDE_REQUEST or IDE_RESPONSE packets. The LBA data is contained in an "LBA low" and "LBA Mid" field for each of the current and previous operations. The two "LBA low" fields generally supply starting LBA addresses for the associated operation, while the "LBA mid" fields contain a length (typically in bytes) for the operation. One-byte values for the sector count previous and sector count current are also maintained to ensure the host and the remote device are able to track the progress of the data being transferred between the devices.

Figure 30:
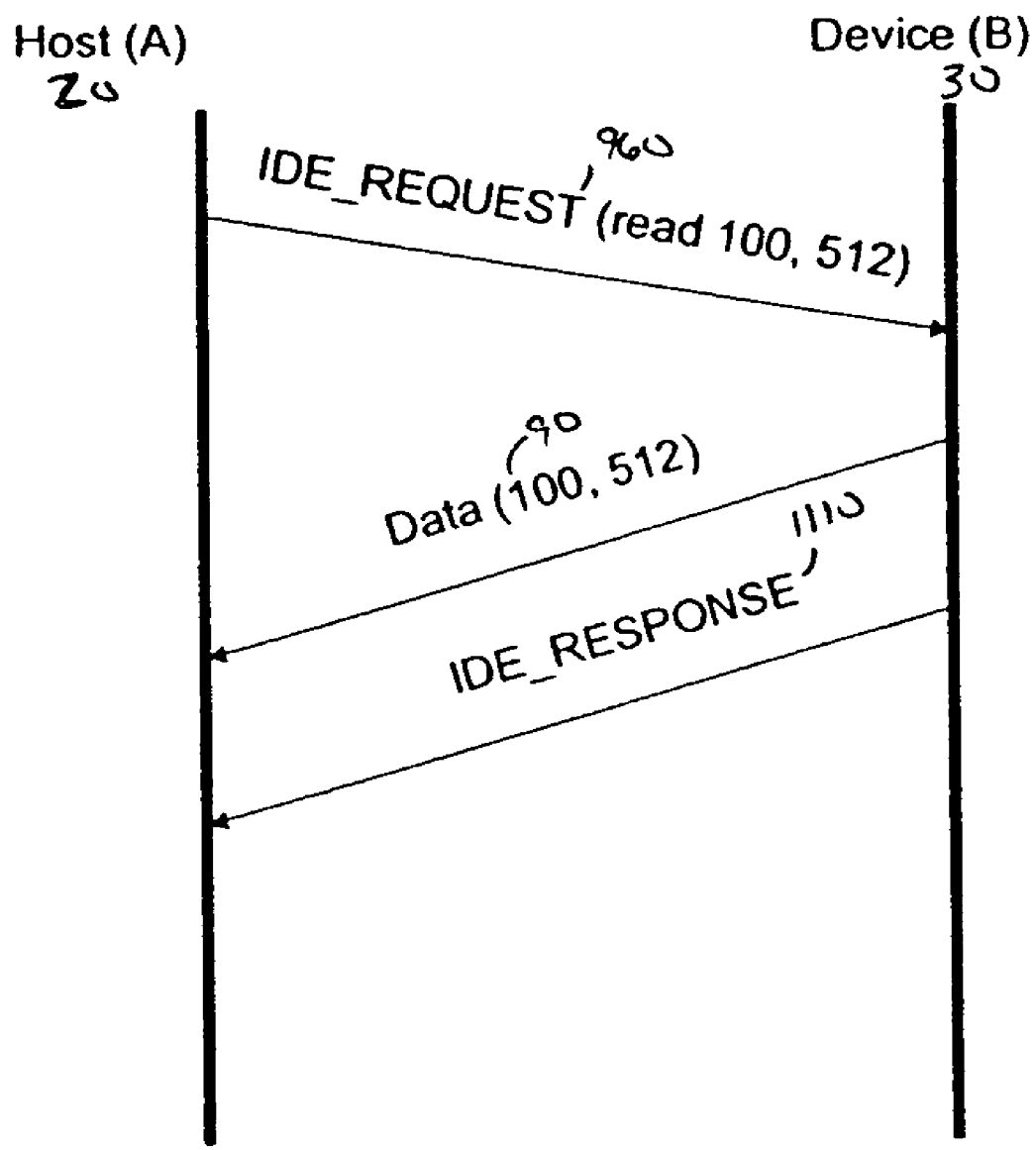
FIG. 30 depicts the packets exchanged during an IDE read operation utilizing the device-level protocol of FIG. 1A.
Figure 31:
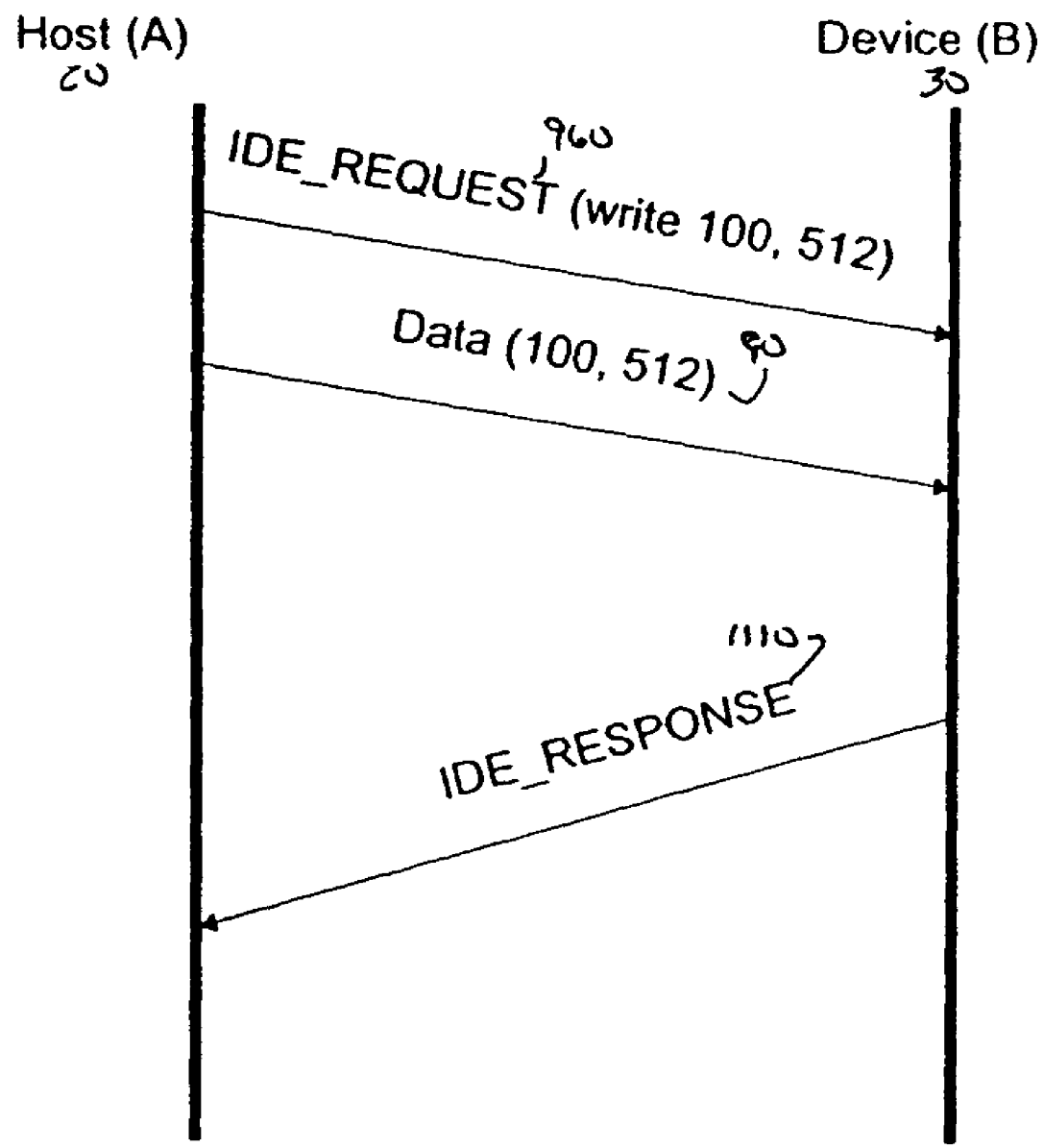
FIG. 31 depicts the packets exchanged during an IDE write operation utilizing the device-level protocol of FIG. 1A.

FIGS. 30 and 31 graphically show simple IDE read and write data transfers, respectively. For an IDE read operation, the host 20 issues an IDE_REQUEST command 960 signifying a read operation beginning at LBA 100 with a length of 512 bytes. Having received and processed this command, the remote device 30 returns the 512 bytes requested in a separate data packet 90, followed by an IDE_RESPONSE command 1110 indicating the completion status of the read operation. In one embodiment of the invention, separate data packets 90 are transferred by either the host 20 or the remote device 30 within the network-level protocol 40, but outside the device-level protocol 60 (i.e., with the headers associated with the network-level protocol, but without the headers defined by the device-level protocol).

Similarly, an IDE write operation is initiated by the host 20 by sending an IDE_REQUEST packet 960t indicating a write operation of 512 bytes starting at LBA 100, followed by a separate data packet 90 with the information to be written. The remote device 30 reads the command and the data to be written, stores the data on its storage medium, and returns an IDE_RESPONSE command 1110 indicating the completion status of the write operation.

4. Conclusion

The disclosed embodiments of the invention provide a two-layer protocol stack that allows network-based communication between a host and a remote device directly attached to the network. The protocol stack allows more robust, yet fast and efficient, communication between the host and the remote device compared to other systems involving a host and a remote device coupled by way of a network.

The network-level protocol layer and the device-level protocol layer have been presented above as a combined protocol stack for facilitating efficient network-based communications between a host and a remote device. However, each protocol may be used in conjunction with numerous other protocols on a variety of physical networks. For example, the network-level protocol layer of the present invention may be employed by or in various other device-level protocol layers employing interfaces other than IDE or ATAPI. Similarly, the device-level protocol layer described above may be adapted to reside atop other current network-level protocol layers, such as Internet Protocol (IP), to form a new protocol stack. As yet another example, any or all of the various fields described herein may be omitted or changed in alternative embodiments of the invention.

Further, although the present invention has been described with reference to specific embodiments and structural elements, it should be understood that alternate embodiments may differ in certain respects without departing from the spirit or scope of the invention. For example, specific bit and byte fields of each of the two protocols are described in detail herein. However, the specific fields, as well as their disclosed size, location, value, and functionality, may vary in alternate embodiments of the invention. Accordingly, the proper scope of the invention is defined by the appended claims.

We claim:

1. An electronic device configured to communicate on a computer network, the device comprising:
    a network adapter, the network adapter having a physical network interface configured to transmit packets to and receive packets from the computer network;
    wherein the device is configured to communicate according to a network protocol stack having:
        a network-level protocol layer configured to provide a transmission service for transferring packets to and from the computer network, and
        a device-level protocol layer configured to send and receive information specific to an interface of a remote electronic device over the network via the transmission service of the network-level protocol layer;
    wherein the network-level protocol layer is configured to interface a network layer with a transport layer of the International Standards Organization Open System Interconnection (ISO OSI) network protocol model; and
    wherein the network protocol stack further comprises: an Ethernet-type header; a network-level header operably attached to the Ethernet-type header; and a data frame operably attached to the network-level header.

2. The electronic device of claim 1, wherein the transmission service of the network-level protocol layer comprises a stream service.

3. The electronic device of claim 1, wherein the transmission service of the network-level protocol layer comprises a datagram service.

4. The electronic device of claim 1, wherein the device-level protocol layer is configured to communicate an Integrated Drive Electronics (IDE) command.

5. An electronic device configured to communicate on a network, the device comprising:
    a network adapter, the network adapter having a physical network interface configured to transmit packets to and receive packets from the network,
    wherein the device is configured to communicate according to a network protocol stack having a network-level protocol layer and a device-level protocol layer, wherein
    the device-level protocol layer is configured to send and receive information specific to an interface of a remote electronic device over the network via a transmission service of the network-level protocol layer, and
    the network-level protocol layer is configured to interface network layer packets with a transport layer of the International Standards Organization Open System Interconnection (ISO OSI) network protocol model; and
    wherein the network protocol stack further comprises: an Ethernet-type header; a network-level header operably attached to the Ethernet-type header; and a data frame operably attached to the network-level header.

6. The electronic device of claim 5, wherein the device-level protocol layer is configured to communicate an Integrated Drive Electronics (IDE) command.

7. The electronic device of claim 5, wherein the device-level protocol layer is configured to communicate an AT Attachment Packet Interface (ATAPI) command.

8. The electronic device of claim 5, wherein the device-level protocol layer is configured to communicate a Small Computer System Interface (SCSI) command.

9. An electronic device configured to communicate with a second electronic device, the electronic device comprising:
    a network adapter, the network adapter having a physical network interface configured to transmit data packets to and receive data packets from a network;

wherein the electronic device is configured to communicate according to a protocol stack having:
  a network protocol layer defining a network protocol layer packet and operative to transmit a network-level command between at least the electronic device and the second electronic device, and
  a device protocol layer defining a device protocol layer packet and operative to transmit a device command relating to a device associated with at least one of the electronic device and the second electronic device;
wherein the network protocol layer packet and device protocol layer packet are transmitted within a single data packet;
wherein the network protocol layer is configured to interface a network layer to a transport layer of the International Standards Organization Open System Interconnection (ISO OSI) network protocol model; and
wherein the protocol stack further comprises: an Ethernet-type header; a network-level header operably attached to the Ethernet-type header; and a data frame operably attached to the network-level header.

10. The electronic device of claim 9, wherein the device protocol layer facilitates transmission of Integrated Drive Electronics commands.

11. The electronic device of claim 9, wherein the network-level command is operative to establish a connection between the electronic device and the second electronic device across a network.

12. The electronic device of claim 11, wherein the device command is not processed until the connection is established.

13. The electronic device of claim 11, wherein the device command is not issued until the network connection is established.

14. An electronic device configured to communicate with a second electronic device, wherein the electronic device comprises:
  a network adapter, the network adapter having a physical network interface configured to transmit data packets to and receive data packets from a network,
  wherein the electronic device is configured to communicate according to a protocol stack having:
    a network protocol layer defining a network protocol layer packet and operative to transmit a network-level command between at least the electronic device and the second electronic device,
    a device protocol layer defining a device protocol layer packet and operative to transmit a device command relating to a device associated with at least one of the electronic device and the second electronic device;
  wherein the network protocol layer packet and device protocol layer packet are transmitted within a single data packet; and
  wherein the protocol stack further comprises: an Ethernet-type header; a network-level header operably attached to the Ethernet-type header; and a data frame operably attached to the network-level header.

15. The electronic device of claim 14, wherein the device protocol layer packet is transmitted within a data frame of the network protocol layer packet.

16. The electronic device of claim 14, wherein the device protocol layer packet is generated within a data frame of the network protocol layer packet.

17. The electronic device of claim 16, wherein:
  the Ethernet-type header comprises no more than 14 bytes; and
  the network-level header comprises no more than 16 bytes.

18. The electronic device of claim 17, wherein the device protocol layer packet comprises: a first header segment; and a second header segment operably attached to the first header segment.

19. The electronic device of claim 18, wherein the device protocol layer packet further comprises at least one of: a header digest operably attached to the second header segment; a data segment operably attached to the second header segment; and a data digest operably attached to the second header segment.

* * * * *